(12) United States Patent
Takase et al.

(10) Patent No.: US 10,668,941 B2
(45) Date of Patent: Jun. 2, 2020

(54) ELECTRIC POWER STEERING APPARATUS

(71) Applicant: NSK Ltd., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/312,695

(22) PCT Filed: Jul. 14, 2017

(86) PCT No.: PCT/JP2017/025709
§ 371 (c)(1),
(2) Date: Dec. 21, 2018

(87) PCT Pub. No.: WO2018/016437
PCT Pub. Date: Jan. 25, 2018

(65) Prior Publication Data
US 2019/0322309 A1    Oct. 24, 2019

(30) Foreign Application Priority Data

Jul. 20, 2016 (JP) ................. 2016-142624
Sep. 21, 2016 (JP) ................. 2016-184017
Jun. 16, 2017 (JP) ................. 2017-118864

(51) Int. Cl.
*B62D 5/00* (2006.01)
*B62D 5/04* (2006.01)
(Continued)

(52) U.S. Cl.
CPC ............. *B62D 5/04* (2013.01); *B62D 6/00* (2013.01); *H02M 7/48* (2013.01); *H02P 21/50* (2016.02); *H02P 27/00* (2013.01)

(58) Field of Classification Search
USPC ........................................... 701/41
See application file for complete search history.

(56) References Cited

U.S. PATENT DOCUMENTS

2008/0262678 A1* 10/2008 Nishimura ........... B62D 5/0472
701/42
2008/0290826 A1* 11/2008 Nagase ................. B62D 5/046
318/400.02

(Continued)

FOREIGN PATENT DOCUMENTS

JP    2007-091182 A    4/2007
JP    2007-099066 A    4/2007
(Continued)

OTHER PUBLICATIONS

International Search Report of PCT/JP2017/025709 dated Oct. 24, 2017 [PCT/ISA/210] English Translation.
(Continued)

*Primary Examiner* — James M McPherson
(74) *Attorney, Agent, or Firm* — Sughrue Mion, PLLC

(57) ABSTRACT

An electric power steering apparatus compensates a dead time of an inverter without tuning operation, improves distortion of a current waveform and responsibility of a current control, and suppresses sound, vibration and ripple. The apparatus calculates dq-axes steering-assist command values based on at least a steering torque, calculates dq-axes current command values from the dq-axes steering-assist command values, converts the dq-axes current command values into 3-phase duty command values, driving-controls a 3-phase brushless motor by an inverter of a PWM control, and applies an assist torque to a steering system of a vehicle. Dead time reference compensation values are calculated based on a motor rotational angle. Dead time compensation of the inverter adds dead time compensation values in which the dead time reference compensation values are processed (Continued)

by using a gain, a sign and the like, to dq-axes voltage command values or to 3-phase voltage command values.

12 Claims, 20 Drawing Sheets

(51) Int. Cl.
    *H02P 21/00*     (2016.01)
    *B62D 6/00*     (2006.01)
    *H02M 7/48*     (2007.01)
    *H02P 27/00*     (2006.01)

(56) References Cited

U.S. PATENT DOCUMENTS

| | | | |
|---|---|---|---|
| 2011/0221368 A1 | 9/2011 | Yabuguchi | |
| 2016/0185384 A1* | 6/2016 | Kodera | B62D 5/0469 |
| | | | 701/41 |
| 2017/0369093 A1* | 12/2017 | Kusatani | H02P 29/024 |

FOREIGN PATENT DOCUMENTS

| | | |
|---|---|---|
| JP | 2007-202365 A | 8/2007 |
| JP | 4681453 B2 | 5/2011 |
| JP | 2011-188633 A | 9/2011 |
| JP | 2015-171251 A | 9/2015 |

OTHER PUBLICATIONS

International Preliminary Report on Patentability of PCT/JP2017/025709 dated Apr. 13, 2018 [PCT/IPEA/409].

\* cited by examiner

PRIOR ART

PRIOR ART d-AXIS ANGLE-DEAD TIME COMPENSATION-VALUE REFERENCE TABLE
(ELECTRIC ANGLE 0-359 [deg])

q-AXIS ANGLE-DEAD TIME COMPENSATION-VALUE REFERENCE TABLE
(ELECTRIC ANGLE 0-359 [deg])

ELECTRIC POWER STEERING APPARATUS

CROSS REFERENCE TO RELATED APPLICATIONS

This application is a National Stage of International Application No. PCT/JP2017/025709, filed Jul. 14, 2017, claiming priorities based on Japanese Patent Application No. 2016-142624, filed Jul. 20, 2016, Japanese Patent Application No. 2016-184017, filed Sep. 21, 2016 and Japanese Patent Application No. 2017-118864, filed Jun. 16, 2017.

TECHNICAL FIELD

The present invention relates to an electric power steering apparatus that vector-controls a driving of a 3-phase brushless motor using a dq-axes rotational coordinate system, compensates a dead time of an inverter based on a function (a dq-axes angle-dead time compensation-value reference table or a 3-phase angle-dead time compensation-value reference table) of a motor rotational angle (an electric angle) and enables to smoothly assist-control without a steering sound.

BACKGROUND ART

An electric power steering apparatus (EPS) which provides a steering mechanism of a vehicle with a steering assist torque (an assist torque) by means of a rotational torque of a motor, applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering-assist command) on the basis of the steering torque Th detected by the torque sensor 10 and a vehicle speed Vs detected by a vehicle speed sensor 12, and controls a current supplied to the motor by means of a voltage control command value Vref obtained by performing a compensation or the like to the calculated current command value. A steering angle sensor 14 is not indispensable and may not be provided. It is possible to obtain the steering angle (a motor rotational angle) θ from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a steering-assist command value calculating section 31. The steering-assist command value calculating section 31 calculates a steering-assist command value Iref1 based on the steering torque Th and the vehicle speed Vs using an assist map or the like. The calculated steering-assist command value Iref1 is added with a compensation signal CM for improving characteristics from a compensating section 34 at an adding section 32A. The steering-assist command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtracted result ΔI (=Irefm−Im) at the subtracting section 32B is current-controlled such as a proportional-integral (PI) at a PI-control section 35. The voltage control value Vref obtained by the current-control, and a modulation signal (a triangle wave carrier) CF are inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feed-back.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM, thereby to improve the control characteristics.

Recently, a 3-phase brushless motor is mainly used as an actuator of the electric power steering apparatus, and since the electric power steering apparatus is on-vehicle products, the operating temperature range is wide. From a view point of a fail-safe, a dead time of the inverter to drive the motor needs greater than that for general industrial purposes that home appliances ("industrial equipment"<"EPS"). Generally, since a switching device (for example, a field-effect transistor (FET)) has a delay time when it is turned-OFF, a direct current link is shorted when the switching devices of an upper-arm and a lower-arm are simultaneously turned-ON or turned-OFF. In order to prevent the above problem, a time (a dead time) that the switching devices of both arms are turned-OFF, is set.

As a result, a current waveform is distorted, and a responsibility of the current control and a steering feeling go down. For example, when the driver slowly steers the handle in a situation that the handle is around a straight running state (an on-center state), a discontinuous steering feeling by means of the torque ripple and like is occurred. Since a back electromotive force (a back-EMF) of the motor in a middle speed steering or a high speed steering and the interference voltage between the windings operate as the disturbance against the current-control, a steering follow-up performance and the steering feeling in turn-back steering are badly affected.

A q-axis that controls the torque and is a coordinate axis of a rotor of the 3-phase brushless motor, and a d-axis that controls strength of a magnetic field are independently set. Since the d-axis crosses at 900 against the q-axis, the vector control system that controls the vectors corresponding to the respective axes currents (a d-axis current command value and a q-axis current command value) is known.

FIG. 3 shows a configuration example of driving-controlling the 3-phase brushless motor 100 by using the vector control system. Steering-assist command values (Iref2 ($i_{dref}$ and $i_{qref}$)) of the 2-axes (the dq-axes coordinate system) are calculated based on the steering torque Th, the vehicle speed Vs and the like. The d-axis current command value $i_d^*$ and the q-axis current command value $i_q^*$ whose max values are limited are inputted into the subtracting sections 131d and 131q, respectively. Current deviations $\Delta i_d^*$ and $\Delta i_q^*$ that are calculated at the subtracting sections 131d and 131q are inputted into the proportional-integral control (PI-control) sections 120d and 120q, respectively. The voltage command values $v_d$ and $v_q$ that are PI-controlled at the PI-control sections 120d and 120q are inputted into the subtracting section 141d and the adding section 141q, respectively. Command voltages $\Delta v_d$ and $\Delta v_q$ that are calculated at the subtracting section 141d and the adding section 141q are inputted into a dq-axes/3-phase alternating current (AC) converting section 150. The voltage command values Vu*, Vv* and Vw* that are converted into the three phases at the dq-axes/3-phase AC converting section 150 are inputted into the PWM-control section 160. The motor 100 is driven with PWM-signals $U_{PWM}$, $V_{PWM}$ and $W_{PWM}$ based on calculated 3-phase duty command values ($Duty_u$, $Duty_v$, $Duty_w$) via the inverter (the inverter-applying voltage VR) 161 constituted by a bridge configuration of an upper-arm and a lower-arm as shown in FIG. 4. The upper-arm comprises FETs Q1, Q3, Q5 serving as switching devices and the lower-arm comprises FETs Q2, Q4, Q6.

3-phase motor currents $i_u$, $i_v$ and $i_w$ of the motor 100 are detected at the current detector 162, and the detected 3-phase currents $i_u$, $i_v$ and $i_w$ are inputted into the 3-phase AC/dq-axes converting section 130. The 2-phase feed-back current $i_d$ and $i_q$ that are converted at the 3-phase AC/dq-axes converting section 130 are subtraction-inputted into the subtracting sections 131d and 131q and a d-q non-interference control section 140. The rotational sensor or the like is attached to the motor 100, and the motor rotational angle θ and the motor rotational number (velocity) ω are outputted from the angle detecting section 110 that processes a sensor signal. The motor rotational angle θ is inputted into the dq-axes/3-phase AC converting section 150 and the 3-phase AC/dq-axes converting section 130, and the motor rotational number ω is inputted into the d-q non-interference control section 140. 2-phase voltages $v_{d1}^*$ and $v_{q1}^*$ from the d-q non-interference control section 140 are inputted into the subtracting section 121d and the adding section 121q, respectively, and the command voltages $\Delta v_d$ and $\Delta v_q$ are calculated at the subtracting section 121d and the adding section 121q. The command voltages $\Delta v_d$ and $\Delta v_q$ are inputted into the dq-axes/3-phase AC converting section 150, and the motor 100 is driven via the PWM-control section 160 and the inverter 161.

The electric power steering apparatus of the vector control system described above is an apparatus to assist a steering of a driver, and also a sound and a vibration of the motor, a torque ripple and the like are transmitted to the driver as a force sense via the handle. The FETs are generally used as power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned-ON and turned-OFF, the FET does not simultaneously turn-ON and turn-OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time of the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]-100 [ns], ON-ON) that the upper-FET is ON and the lower FET is ON, often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

Conventionally, as a method to compensate the dead time of the inverter, there are methods to add the compensation value to the dead time by detecting a timing occurring the dead time and to compensate the dead time by a disturbance observer on the dq-axes in the current control.

The electric power steering apparatus to compensate the dead time is disclosed in, for example, Japanese Patent No. 4681453 B2 (Patent Document 1) and Japanese Unexamined Patent Publication No. 2015-171251A (Patent Document 2). In Patent Document 1, there is provided a dead band compensation circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensation circuit is a changing value in proportion to the model current in a region being a predetermined fixed value or less, and is an addition value of the changing values in proportion to the fixed value and the model current in a region being the predetermined fixed value or more. In this way, the output value of the compensation circuit is outputted from the current command to the voltage command. However, the tuning operation for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

The present invention has been developed in view of the above-described circumstances, and an object of the present invention is to provide the electric power steering apparatus of the vector control system that compensates the dead time of the inverter without the tuning operation, improves the distortion of the current waveform and the responsibility of the current control, and suppresses the steering sound, the vibration and the ripple.

Means for Solving the Problems

The present invention relates to an electric power steering apparatus of a vector control system that calculates dq-axes steering-assist command values based on at least a steering torque, calculates dq-axes current command values from the dq-axes steering-assist command values, converts the dq-axes current command values into 3-phase duty command values, driving-controls a 3-phase brushless motor by an inverter of a pulse width modulation (PWM) control, and applies an assist torque to a steering system of a vehicle, the above-described object of the present invention is achieved by that: wherein 3-phase dead time reference compensation values are calculated based on a motor rotational angle, wherein the 3-phase dead time reference compensation values are processed by using a gain and a sign, wherein dq-axes dead time compensation values are obtained by performing 3-phase/dq-axes conversion to the 3-phase dead time reference compensation values, and wherein a dead time compensation of the inverter is performed by adding the dq-axes dead time compensation values to dq-axes voltage command values which are obtained by processing the dq-axes current command values.

The present invention relates to an electric power steering apparatus of a vector control system that calculates dq-axes steering-assist command values based on at least a steering torque, calculates dq-axes voltage command values from the dq-axes steering-assist command values, converts the dq-axes voltage command values into 3-phase duty command values, driving-controls a 3-phase brushless motor by an inverter of a PWM control, and applies an assist torque to a steering system of a vehicle, the above-described object of the present invention is achieved by that: wherein a dead time compensation of the inverter is performed by adding dq-axes dead time compensation values obtained by multiplying dq-axes dead time reference compensation values, which are obtained from an angle-dead time compensation-value reference table having a characteristic that 3-phase dead time compensation values based on a motor rotational angle are converted into 2-phase values, by a voltage sensitive-gain sensitive to an inverter-applying voltage, to the dq-axes voltage command values.

Further, the present invention relates to an electric power steering apparatus of a vector control system that calculates dq-axes steering-assist command values based on at least a steering torque, calculates dq-axes current command values from the dq-axes steering-assist command values, converts the dq-axes current command values into 3-phase duty command values, driving-controls a 3-phase brushless motor by an inverter of a PWM control, and applies an assist torque to a steering system of a vehicle, the above-described object of the present invention is achieved by that: comprising an angle-dead time compensation-value functional section to calculate 3-phase dead time reference compensation values based on a motor rotational angle, an inverter-applying voltage sensitive-gain calculating section to calculate a voltage sensitive-gain based on an inverter-applying voltage, and a dead time compensation-value outputting section to add dq-axes dead time compensation values that are obtained by multiplying the 3-phase dead time reference compensation values with the voltage sensitive-gain and converting 3-phase multiplied values into dq-axes values, to dq-axes voltage command values that are obtained by processing the dq-axes current command values.

Furthermore, the present invention relates to an electric power steering apparatus of a vector control system that calculates dq-axes steering-assist command values based on at least a steering torque, calculates dq-axes voltage command values from the dq-axes steering-assist command values, converts the dq-axes voltage command values into 3-phase duty command values, driving-controls a 3-phase brushless motor by an inverter of a PWM control, and applies an assist torque to a steering system of a vehicle, the above-described object of the present invention is achieved by that: comprising an angle-dead time compensation-value reference table having a characteristic that 3-phase dead time compensation values based on a motor rotational angle are converted into 2-phase values, an inverter-applying voltage sensitive-gain calculating section to calculate a voltage sensitive-gain based on an inverter-applying voltage, a first multiplying section to multiply dq-axes dead time reference compensation values from the angle-dead time compensation-value reference table with the voltage sensitive-gain, a current command value sensitive-gain calculating section to calculate a current command value sensitive-gain in order that a compensation amount is changeable depending on the steering-assist command values, and a second multiplying section to multiply outputs of the first multiplying section with the current command value sensitive-gain, wherein a dead time compensation is performed by adding outputs of the second multiplying section to the dq-axes voltage command values.

The present invention relates to an electric power steering apparatus of a vector control system that calculates dq-axes steering-assist command values based on at least a steering torque, calculates dq-axes current command values from the dq-axes steering-assist command values, converts the dq-axes current command values into 3-phase duty command values, driving-controls a 3-phase brushless motor by an inverter of a PWM control, and applies an assist torque to a steering system of a vehicle, the above-described object of the present invention is achieved by that: wherein 3-phase dead time reference compensation values are calculated based on a motor rotational angle, wherein 3-phase dead time compensation values are obtained by processing the 3-phase dead time reference compensation values using a gain and a sign, and wherein a dead time compensation of the inverter is performed by adding the 3-phase dead time compensation values to 3-phase voltage command values after dq-axes spatial vector modulation.

Further, the present invention relates to an electric power steering apparatus of a vector control system that calculates dq-axes steering-assist command values based on at least a steering torque, calculates dq-axes current command values from the dq-axes steering-assist command values, converts the dq-axes current command values into 3-phase duty command values, driving-controls a 3-phase brushless motor by an inverter of a PWM control, and applies an assist torque to a steering system of a vehicle, the above-described object of the present invention is achieved by that: comprising a spatial vector modulating section to obtain 3-phase voltage command values by spatial-vector-modulating the dq-axes current command values, an angle-dead time compensation-value functional section to calculate 3-phase dead time reference compensation values based on a motor rotational angle, an inverter-applying voltage sensitive-gain calculating section to calculate a voltage sensitive-gain based on an inverter-applying voltage, a first multiplying section to obtain first 3-phase dead time compensation values by multiplying the 3-phase dead time reference compensation values with the voltage sensitive-gain, a current command value sensitive-gain calculating section to calculate a current command value sensitive-gain in which a compensation amount of the first 3-phase dead time compensation values is changeable depending on the steering-assist command values, and a dead time compensation-value outputting section to output second dead time compensation values by multiplying the first third-phase dead time compensation values with the current command value sensitive-gain, wherein a dead time compensation of the inverter is performed by adding the second dead time compensation values to the 3-phase voltage command values.

Effects of the Invention

The electric power steering apparatus according to the present invention calculates the dead time compensation values of the inverter based on the motor rotational angle (the electric angle), and compensates the dead times by adding (feed-forwarding) the dead time compensation values to the dq-axes voltage command values. Thereby, without the tuning operation, the dead time of the inverter is compensated on the dq-axes or the three phases, and improvements in the distortion of the current waveform and the responsibility of the current control can be achieved. The magnitude and the direction of the dead time compensation values are adjusted by the steering-assist command values ($i_{qref}$) and are changeable in order that the dead time compensation values are not overcompensated.

Since the control is smoothly operated by the dead time compensation based on the function of the motor rotational angle (the electric angle), the sound and the vibration of the motor, and the torque ripple can be suppressed. The present invention has a high compensation accuracy in the low speed and the middle speed regions that the motor angle is coincident with the phase of the 3-phase current. Even in a case that the compensation waveforms of the 3-phase are not rectangular wave, the compensation can be performed.

BRIEF DESCRIPTION OF THE DRAWINGS

In the accompanying drawings.

MODE FOR CARRYING OUT THE INVENTION

In order to resolve a problem that a current distortion and a torque ripple occur due to an influence of a dead time of an inverter in a control unit (ECU) and a steering sound is louder, the present invention treats dead time compensation values as a function of a motor rotational angle (an electric angle), and performs a feed-forward compensation to 3-phase voltage command values after a dq-axes modulation or a spatial vector modulation. The dq-axes dead time compensation values or the 3-phase dead time compensation values are previously obtained by using the function depending on the motor rotational angle (the electric angle) in offline. A dq-axes angle (a 3-phase angle)-dead time compensation-value reference table is created based on the output waveforms of the above compensation values. The feed-forward dead time compensation is performed to the dq-axes voltage command values or the 3-phase voltage command values by using the dq-axes angle (the 3-phase angle)-dead time compensation-value reference table.

Adjustment of an appropriate dead time compensation amount and an estimation of a compensation direction can be performed by using steering-assist command values of a dq-axes command section or a 3-phase command section. The dead time compensation amount is adjusted by an inverter-applying voltage, appropriately. The dead time compensation values due to the motor rotational angle can be calculated on a real time, and the dead time compensation values depending on the motor rotational angle can be compensated on the dq-axes voltage values or the 3-phase voltage values.

In a low speed steering region and a middle speed steering region, there are problems (the steering sound is louder, and the uncomfortable steering feeling increases) that a compensation shift on an amplitude of a particular phase current and a compensation shift in particular rotational number are caused in conventional 3-phase dead time compensation. To adjust a timing in the conventional 3-phase dead time compensation, it is necessary to consider the magnitudes of the rotational number and the amplitude of the phase currents. The optimal adjustment that the both magnitudes are considered is difficult. In the conventional 3-phase dead time compensation, in a case that the 3-phase compensation waveforms are not a rectangular wave, there is a problem that the precise compensation cannot be performed. In order to resolve such a problem, the present invention that has a great effect in the low speed and middle speed steering states, is proposed.

Embodiments according to the present invention will be described with reference to the drawings.

Figure 1:
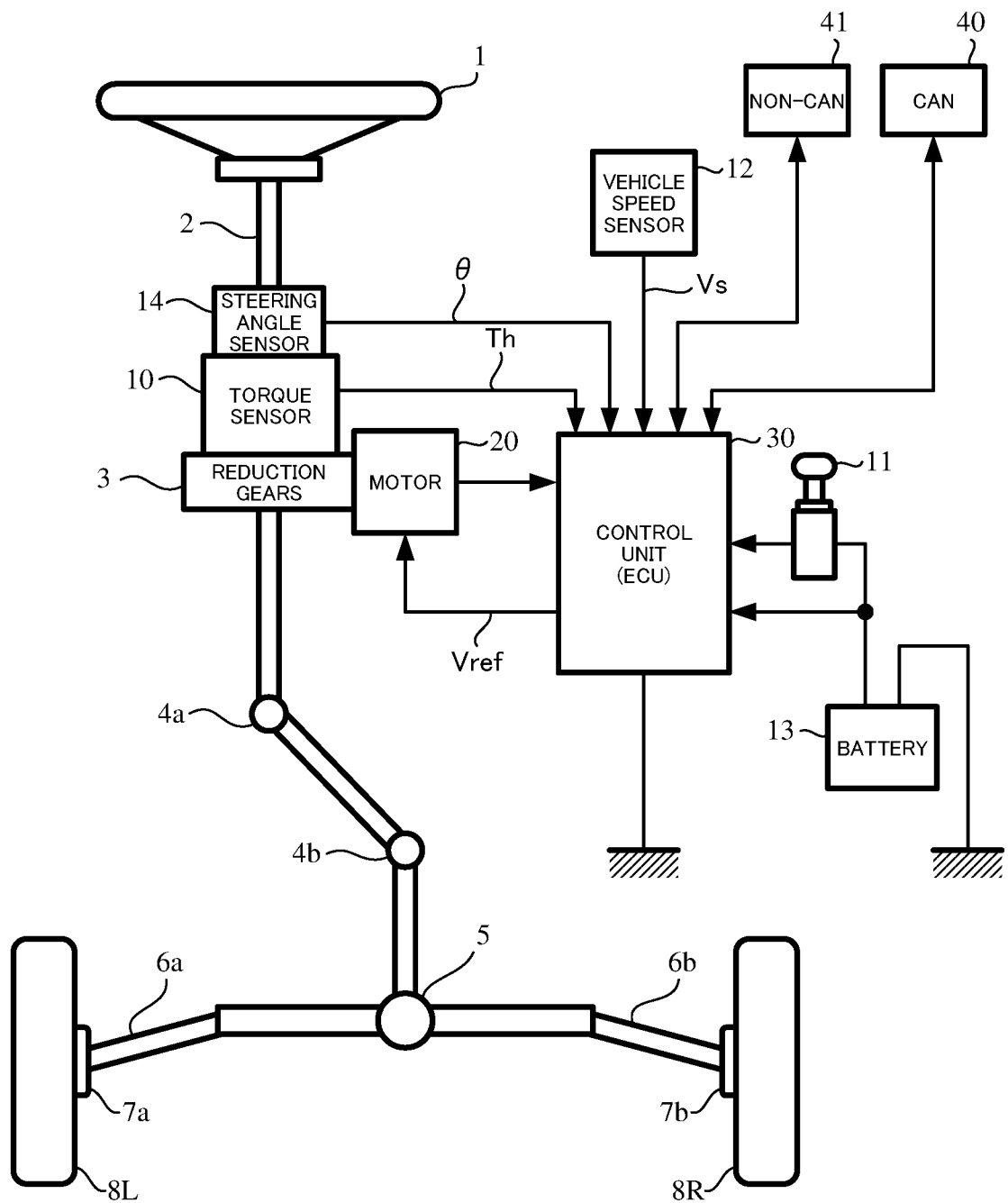
FIG. 1 is a configuration diagram showing a general outline of an electric power steering apparatus.
Figure 2:
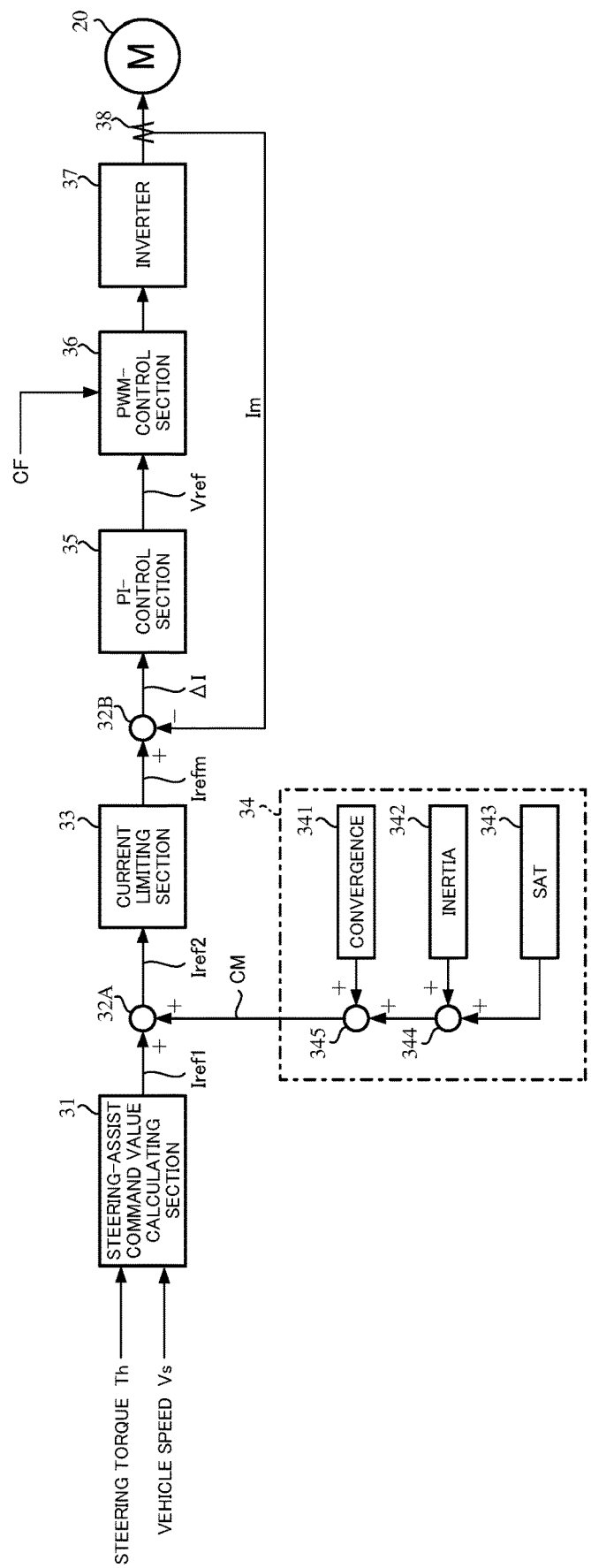
FIG. 2 is a block diagram showing a configuration example of a control unit (ECU) of the electric power steering apparatus.
Figure 3:
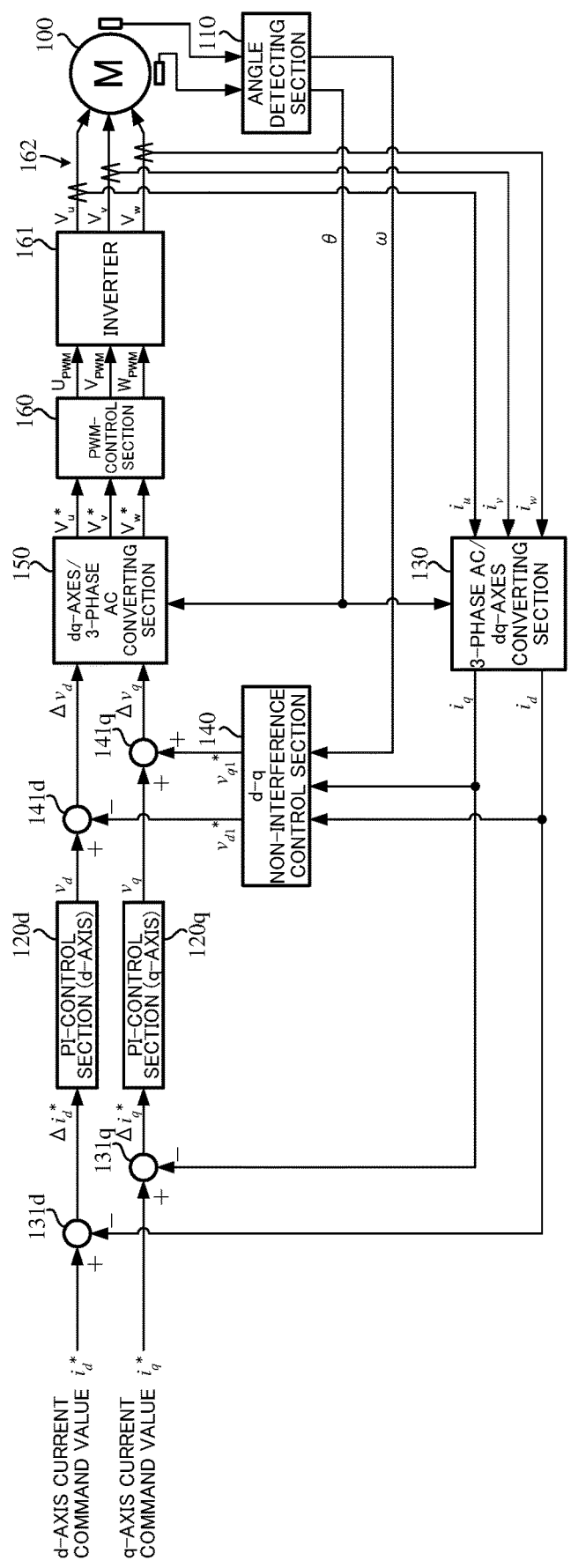
FIG. 3 is a block diagram showing a configuration example of a vector control system.
Figure 4:
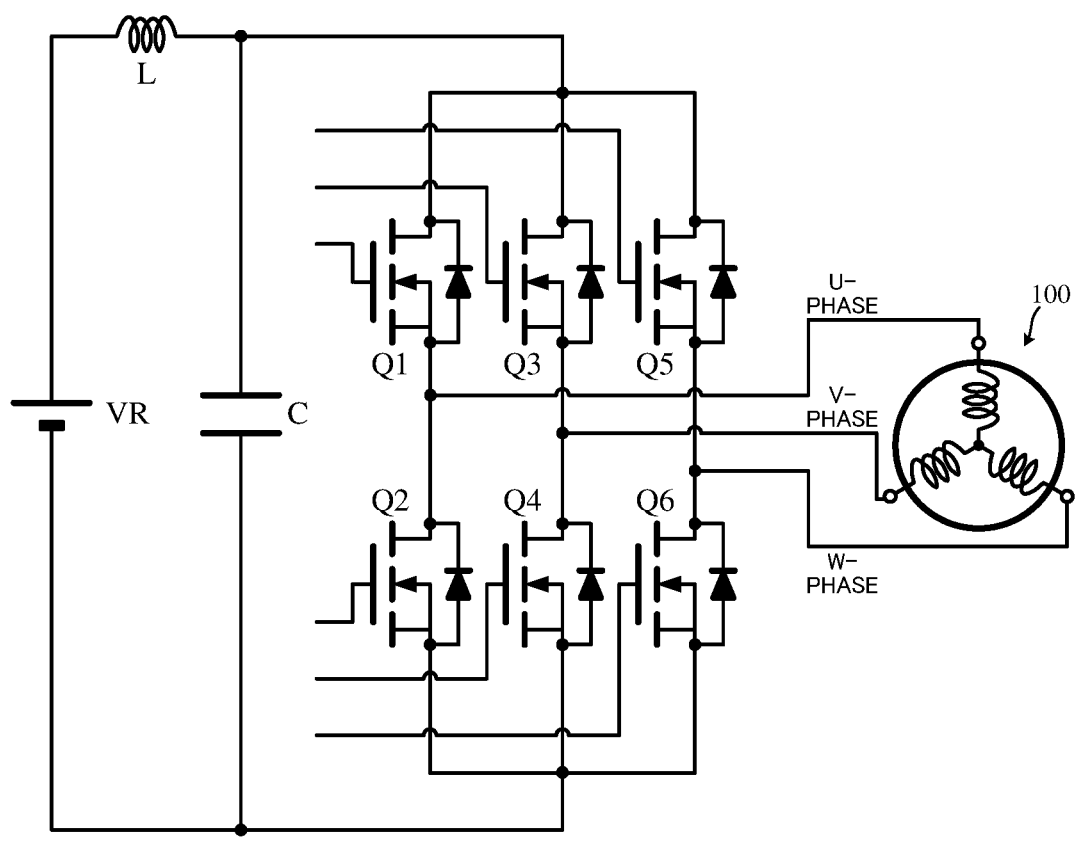
FIG. 4 is a wiring diagram showing a configuration example of a general inverter.
Figure 5:
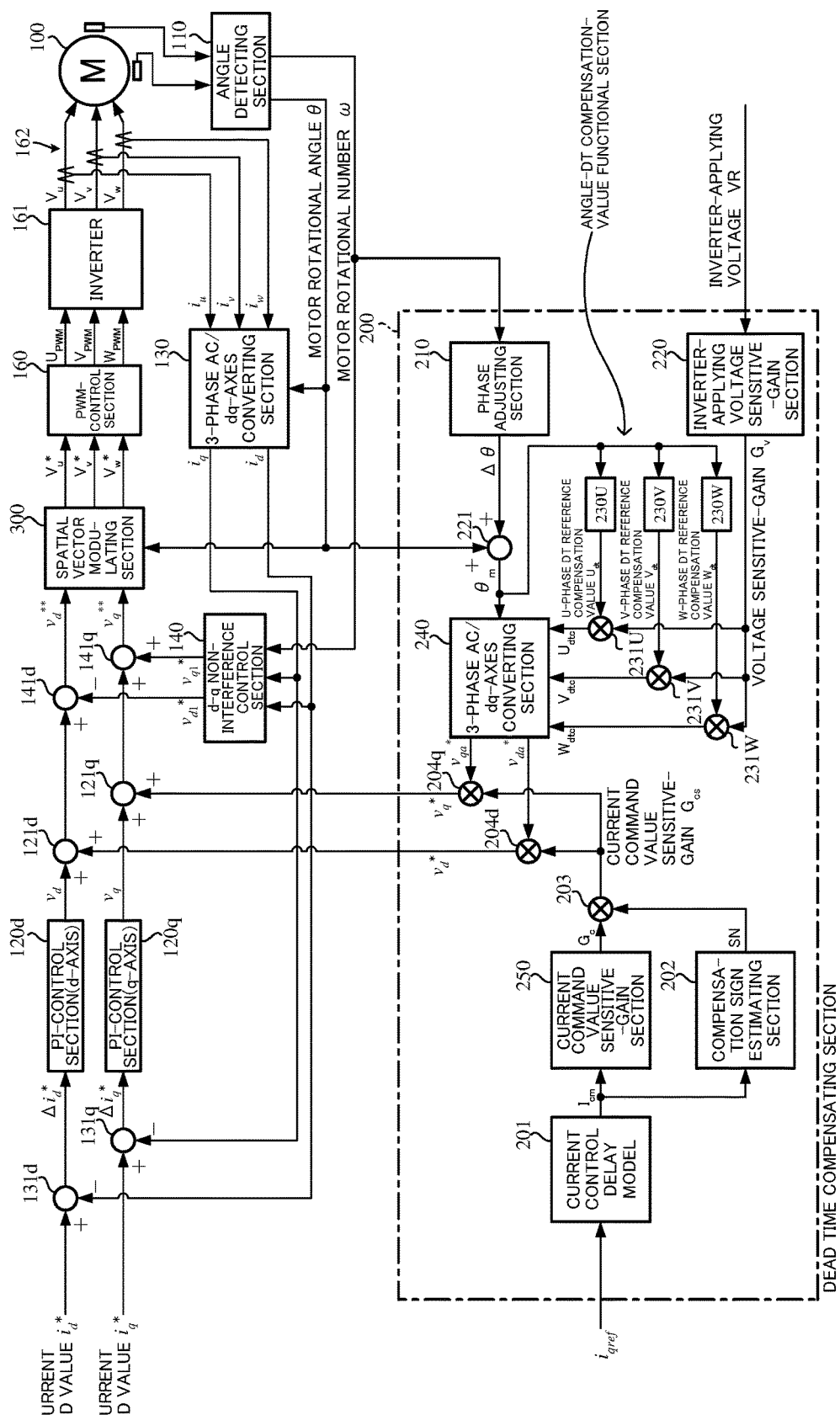
FIG. 5 is a block diagram showing a configuration example (the first embodiment) of the present invention.

FIG. 5 shows a whole configuration example (the first embodiment) of the present invention corresponding to FIG. 3, and there is provided a dead time compensating section 200 to calculate dead time compensation values $v_d^*$ and $v_q^*$ on the dq-axes. The q-axis steering-assist command value $I_{qref}$ corresponding to the steering-assist command values Iref2 in FIG. 2, a motor rotational angle θ and a motor rotational number ω are inputted into the dead time compensating section 200. An inverter-applying voltage VR applied to the inverter 161 is also inputted into the dead time compensating section 200. PWM-signals ($U_{PWM}$, $V_{PWM}$ and $W_{PWM}$) from a PWM-control circuit (not shown) in a PWM-control section 160 are inputted into the inverter 161.

A d-axis current command value $i_d^*$ and a q-axis current command value $i_q^*$ whose maximum values of the steering-assist command values $i_{dref}$ and $i_{qref}$ are limited are respectively inputted into subtracting sections 131d and 131q, and current deviations $\Delta i_d^*$ and $\Delta i_q^*$ for the feed-back currents $i_d$ and $i_q$ are respectively calculated at the subtracting sections 131d and 131q. The calculated current deviation $\Delta i_d^*$ is inputted into the PI-control section 120d, and the calculated current deviation $\Delta i_q^*$ is inputted into the PI-control section 120q. The PI-controlled d-axis voltage command value $v_d$ and q-axis voltage command value $v_q$ are inputted into the adding sections 121d and 121q, the dead time compensation values $v_d^*$ and $v_q^*$ from the dead time compensating section 200 described below are added and compensated at the adding section 121d and 121q, and the compensated voltage values are respectively inputted into the subtracting section 141d and the adding section 141q. The voltage $v_{d1}^*$ from the d-q non-interference control section 140 is inputted into the subtracting section 141d, and the voltage command value $v_d^{**}$ being the difference is obtained. The voltage $v_{q1}^*$ from the d-q non-interference control section 140 is inputted into the adding section 141q, and the voltage command value $v_q^{}$ being the addition result is obtained. The voltage command values $v_d^{}$ and $v_q^{**}$ which are dead time-compensated are inputted into a spatial vector modulating section 300 that converts 2-phase values on the dq-axes into 3-phase values of a U-phase, a V-phase and a W-phase and superimposes a third-harmonic. 3-phase voltage command values $V_u^*$, $V_v^*$ and $V_w^*$ vector-modulated at the spatial vector modulating section 300 are inputted into the PWM-control section 160, and the motor 100 is driving-controlled via the PWM-control section 160 and the inverter 161 as described above.

Next, the dead time compensating section 200 will be described.

The dead time compensating section 200 comprises a current control delay model 201, a compensation sign estimating section 202, multiplying sections 203, 204d and 204q, an adding section 221, a phase adjusting section 210, an inverter-applying voltage sensitive-gain section 220, angle-dead time compensation-value functional sections 230U, 230V and 230W, multiplying sections 231U, 231V and 231W, a 3-phase alternating current (AC)/dq-axes converting section 240, and a current command value sensitive-gain section 250.

As well, the multiplying sections 231U, 231V and 231W and the 3-phase AC/dq-axes converting section 240A constitute a dead time compensation-value outputting section. The current control delay model 201, the compensation sign estimating section 202, the current command value sensitive-gain section 250 and the multiplying section 203 constitute a current command value sensitive-gain calculating section.

Figure 6:
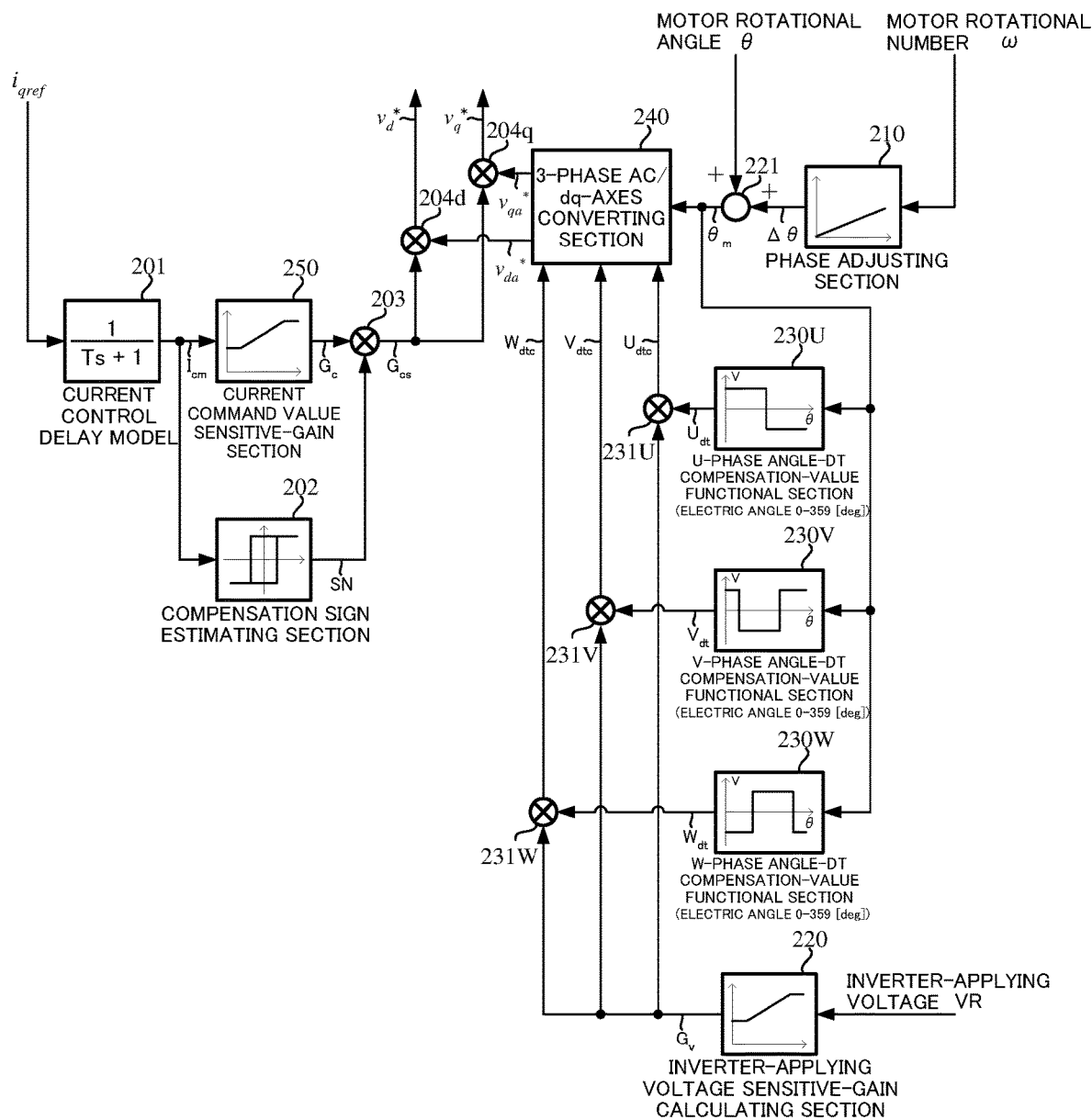
FIG. 6 is a block diagram showing a detail configuration example of a dead time compensating section according to the present invention.

The detail configuration of the dead time compensating section 200 is shown in FIG. 6, and will be described with reference to FIG. 6.

The q-axis steering-assist command value $i_{qref}$ is inputted into the current control delay model 201. A delay due to a noise filter or the like in the ECU is occurred until the dq-axes current command values $i_d^*$ and $i_q^*$ are reflected for the actual currents. When the sign is directly judged from the current command value $i_q^*$, the timing deviation can be occurred. In order to resolve this problem, the first embodiment approximates the delay of the overall current control as a first order filter model and improves the phase difference. The current control delay model 201 of the first embodiment is a primary filter of the below Expression 1 and "T" denotes a filter time constant. The current control delay model 201 may be a model of a secondary filter or higher order filter.

$$\frac{1}{Ts+1} \quad \text{[Expression 1]}$$

The current command value $I_{cm}$ outputted from the current control delay model 201 is inputted into the current command value sensitive-gain section 250 and the compensation sign estimating section 202. In a low current region, a case that the dead time compensation amount is overcompensated is occurred. The current command value sensitive-gain section 250 has a function that a gain, which the compensation amount is reduced depending on the magnitude of the current command value $I_{cm}$ (the steering-assist command value $i_{qref}$), is calculated. In order that the gain, which the compensation amount is reduced, is not largely changed due to a noise from the current command value $I_{cm}$ (the steering-assist command value $i_{qref}$), or the like, a noise reduction process is performed by using a weighted average filter.

Figure 7:
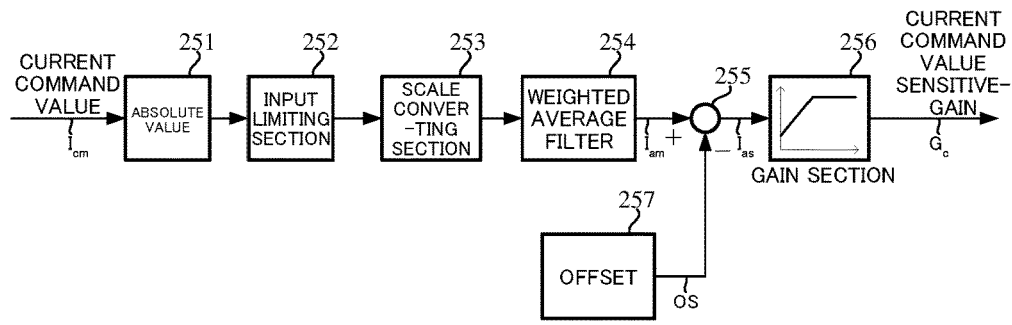
FIG. 7 is a block diagram showing a configuration example of a current command value sensitive-gain section.
Figure 8:
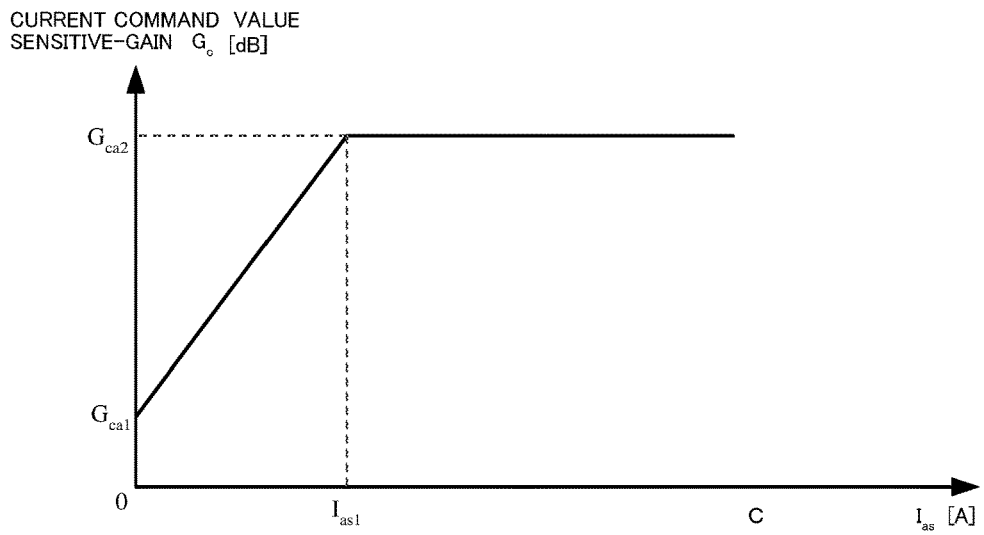
FIG. 8 is a characteristic diagram showing a gain section in the current command value sensitive-gain section.

The current command value sensitive-gain 250 has a configuration shown in FIG. 7. An absolute value of the current command value $I_{cm}$ is calculated at an absolute value section 251. The absolute value of the current command value $I_{cm}$ whose maximum value is limited is inputted into a weighted average filter 254 via a scale converting section 253. The current command value $I_{am}$ that the noise is reduced at the weighted average filter 254 is addition-inputted into a subtracting section 255, and a predetermined offset OS is subtracted from the current command value $I_{am}$ at the subtracting section 255. The reason for subtracting the offset OS is to prevent a chattering due to a minute current command value, and the input value that is equal to or smaller than the offset OS is fixed to the minimum gain. The offset OS is a constant value. The current command value $I_{as}$ that the offset OS is subtracted at the subtracting section 255 is inputted into a gain section 256, and the current command value sensitive-gain $G_c$ is outputted in accordance with a gain characteristic as shown in FIG. 8.

Figure 9:
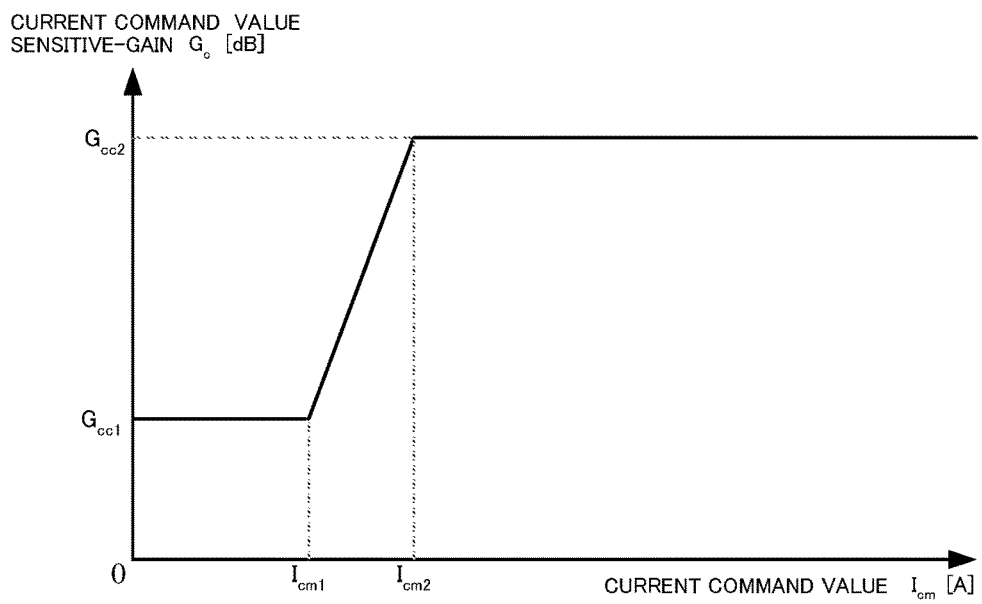
FIG. 9 is a characteristic diagram showing a characteristic example of the current command value sensitive-gain section.

The current command value sensitive-gain $G_c$ outputted from the current command value sensitive-gain section 250 has a characteristic, for example, as shown in FIG. 9, for the inputted current command value $I_{cm}$. That is, the current command value sensitive-gain $G_c$ is a constant gain $G_{cc1}$ when the current command value $I_{cm}$ is smaller than a predetermined current $I_{cm1}$, linearly (or nonlinearly) increases when the current command value $I_{cm}$ is equal to or larger than the predetermined current $I_{cm1}$ and is smaller than a predetermined current $I_{cm2}$ ($>I_{cm1}$), and holds a constant gain $G_{cc2}$ when the current command value $I_{cm}$ is equal to or larger than the predetermined current $I_{cm2}$. The predetermined current $I_{cm1}$ may be zero.

Figure 10A:
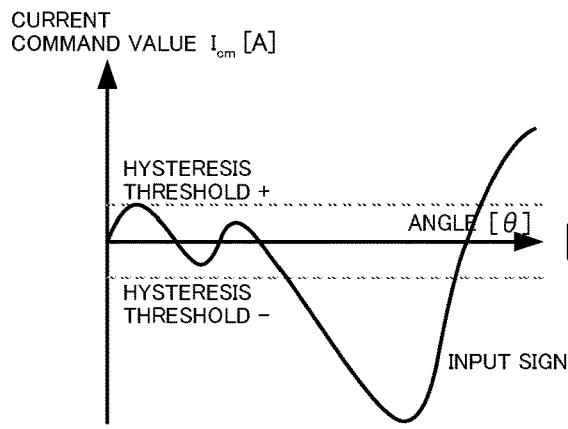
FIG. 10A and FIG. 10B are waveform charts showing an operation example of a compensation sign estimating section.
Figure 10B:
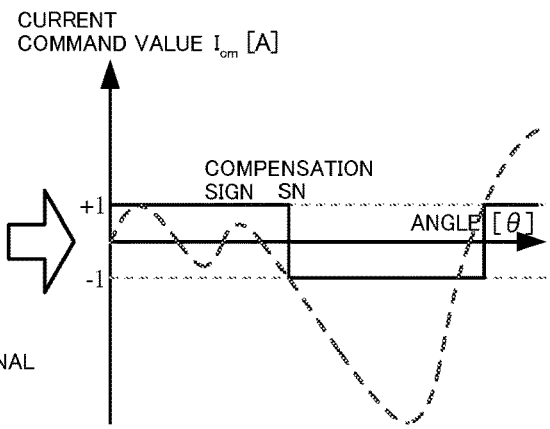

The compensation sign estimating section 202 outputs a compensation sign SN, which has a positive value (+1) or a negative value (−1) and indicates a hysteresis characteristic shown in FIGS. 10A and 10B, against the inputted current command value $I_{cm}$. The compensation sign SN is estimated based on zero-cross points of the current command value $I_{cm}$ as a reference. In order to suppress the chattering, the compensation sign SN has the hysteresis characteristic. The estimated compensation sign SN is inputted into the multiplying section 203. The positive and negative thresholds of the hysteresis characteristic are appropriately changeable.

In a case that the sign of the dead time compensation value is simply determined from the current sign of the phase-current command value model, the chattering is occurred in the low load. When the handle is slightly steered to the left or the right near the on-center, the torque ripple is occurred. In order to improve this problem, the hysteresis is adopted in the sign judgement. The current sign is held except for a case that the sign is changed beyond the set current value, and the chattering is suppressed.

The current command value sensitive-gain $G_c$ from the current command value sensitive-gain section 250 is inputted into the multiplying section 203. The multiplying section 203 outputs the current command value sensitive-gain $G_{cs}$ (=$G_c \times SN$) that the compensation sign SN is multiplied with the current command value sensitive-gain $G_c$. The current command value sensitive-gain $G_{cs}$ is inputted into the multiplying sections 204d and 204q.

Figure 11:
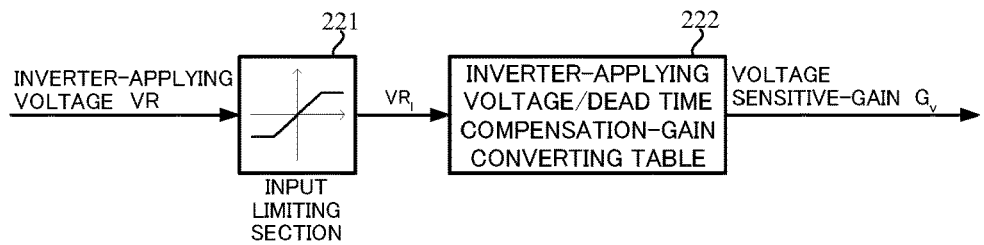
FIG. 11 is a block diagram showing a configuration example of an inverter-applying voltage sensitive-gain section.
Figure 12:
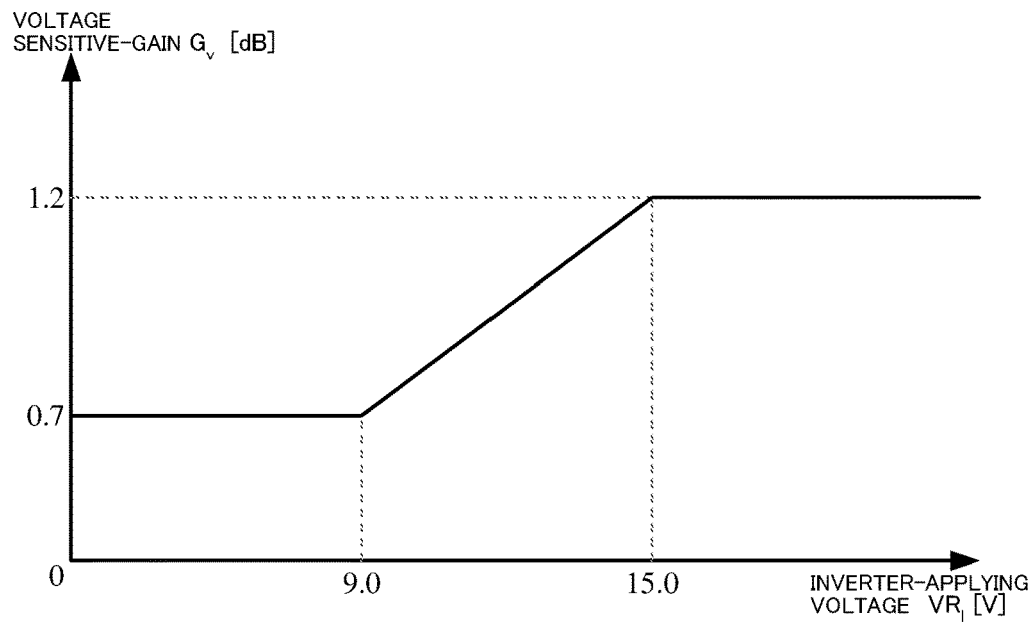
FIG. 12 is a characteristic diagram showing a characteristic example of the inverter-applying voltage sensitive-gain section.

Further, since the optimal dead time compensation amount varies depending on the inverter-applying voltage VR, the present embodiment (the first embodiment) calculates the voltage sensitive-gain $G_v$ depending on the inverter-applying voltage VR and changes the dead time compensation amount. The configuration of the inverter-applying voltage sensitive-gain calculating section 220 to output the voltage sensitive-gain $G_v$ by inputting the inverter-applying voltage VR is shown in FIG. 11. An absolute value of the maximum value of the inverter-applying voltage VR is limited in an input limiting section 221 and the limited inverter-applying voltage $VR_I$ is inputted into an inverter-applying voltage/dead time compensation-gain converting table 222. The characteristic of the inverter-applying voltage/dead time compensation-gain converting table 222 is shown, for example, in FIG. 12. The inverter-applying voltages 9.0[V] and 15.0 [V] of inflection points and the voltage sensitive-gains "0.7" and "1.2" are presented as examples and are appropriately changeable. The voltage sensitive-gain $G_v$ is inputted into the multiplying sections 231U, 231V and 231W.

Figure 13:
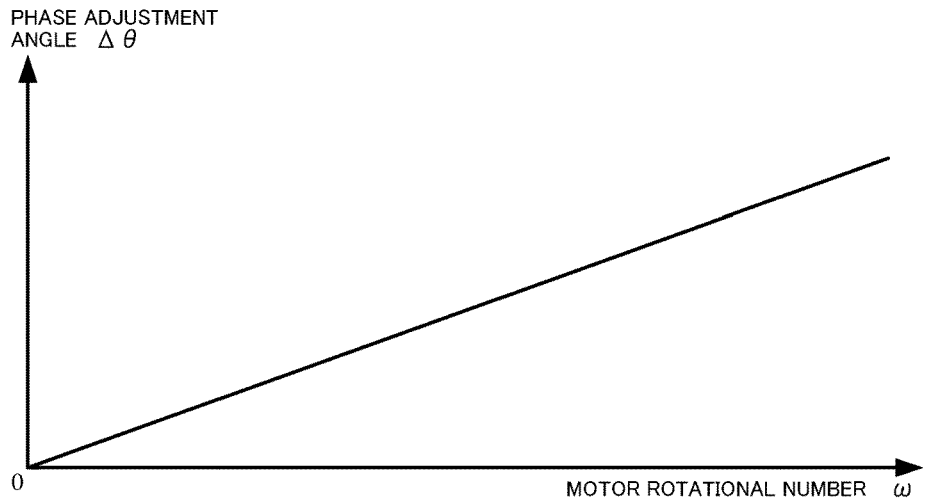
FIG. 13 is a characteristic diagram showing a characteristic example of a phase adjusting section.

In a case that the dead time compensation timing is hastened or is delayed in response to the motor rotational number w, the phase adjusting section 210 has a function to calculate the adjustment angle depending on the motor rotational number w. The phase adjusting section 210 has a characteristic as shown in FIG. 13 in a case of a lead angle control. The calculated phase adjustment angle Δθ is inputted into the adding section 221 and is added to the detected motor rotational angle θ. The motor rotational angle $θ_m$ (=θ+ΔG) that is an added result of the adding section 421 is inputted into the angle-dead time compensation-value functional sections 230U, 230V and 230W and the 3-phase AC/dq-axes converting section 240.

After detecting a motor electric angle and calculating the duty command values, a time delay whose time is several tens of microseconds to one hundred microseconds is existed until actually reflecting for the PWM-signals. Since the motor is rotating during the delay time, a phase shift between the motor electric angle in the calculation and the motor electric angle in the reflection is generated. In order to compensate this phase shift, the lead angle is performed depending on the motor rotational number ω and the phase is adjusted.

Figure 14:
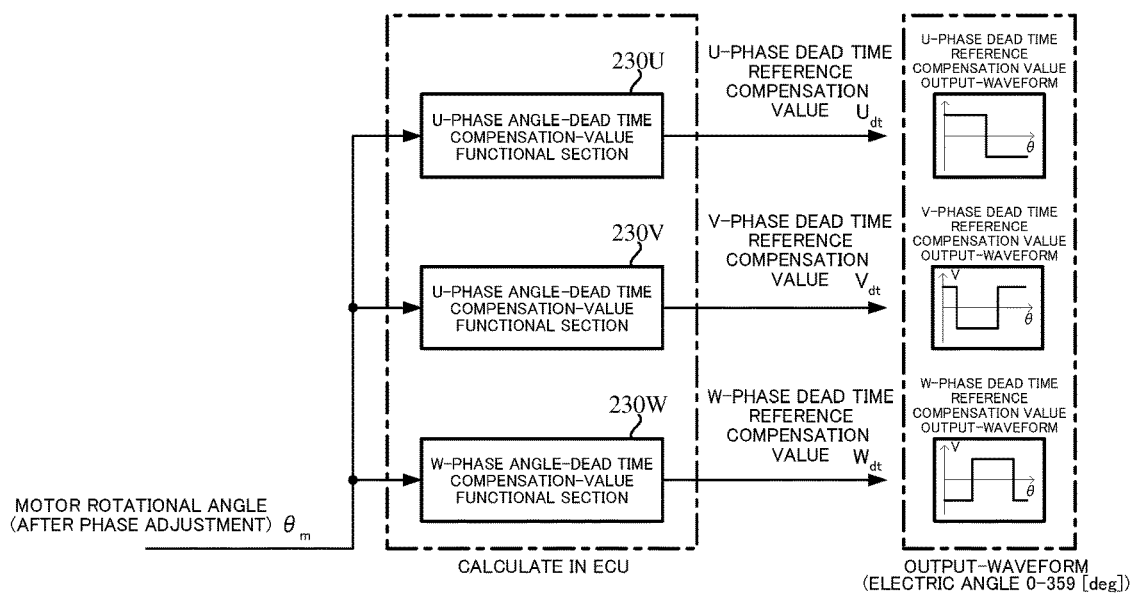
FIG. 14 is a diagram showing an operation example of a respective angle-dead time compensation-value functional section.

The angle-dead time compensation-value functional sections 230U, 230V and 230W, as shown in FIG. 14 in detail, respectively output respective rectangular-wave dead time reference compensation values $U_{dt}$, $V_{dt}$ and $W_{dt}$ whose phases are shifted each other by 120 [deg] in a range of "0" to "359" [deg] in the electric angle, to the phase-adjusted motor rotational angle $θ_m$. The angle-dead time compensation-value functional sections 230U, 230V and 230W treat the dead time compensation values, which are needed in the 3-phases, as functions depending on the angle, calculates the dead time compensation values in the real time of the ECU, and outputs the 3-phase dead time reference compensation values $U_{dt}$, $V_{dt}$ and $W_{dt}$. The angle functions of the dead time reference compensation values are different depending on the characteristic of the dead time in the ECU.

The dead time compensation values $U_{dt}$, $V_{dt}$ and $W_{dt}$ are respectively inputted into multiplying sections 231U, 231V and 231W, and are multiplied with the voltage sensitive-gain $G_v$. The 3-phase dead time compensation values $U_{dtc}$ (=$G_v \cdot U_{dt}$), $V_{dtc}$ (=$G_v \cdot V_{dt}$) and $W_{dtc}$ (=$G_v \cdot W_{dt}$) which are multiplied with the voltage sensitive-gain $G_v$ are inputted into the 3-phase AC/dq-axes converting section 240. The 3-phase AC/dq-axes converting section 240 converts the 3-phase dead time compensation values $U_{dtc}$, $V_{dtc}$ and $W_{dtc}$ into the 2-phase dq-axes dead time compensation values $v_{da}^*$ and $v_{qa}^*$, in synchronization with the motor rotational angle θm. The 2-phase dq-axes dead time compensation values $v_{da}^*$ and $v_{qa}^*$ are respectively inputted into the multiplying sections 204d and 204q, and are multiplied with the current command value sensitive-gain $G_{cs}$. The multiplied results at the multiplying sections 204d and 204q are the dead time compensation value $v_d^*$ and $v_q^*$. The dead time compensation value $v_d^*$ and $v_q$ are respectively added to the voltage command values $v_d$ and $v_q$ at the adding sections 121d and 121q. The voltage command values $v_d^{}$ and $v_q^{}$, which are the added results, are inputted into the spatial vector modulation section 300 via the adding section 141d and the subtracting section 141q.

In the first embodiment, the dead time compensation values are 3-phase functions depending on the motor rotational angle (the electric angle), and the control unit (ECU) has a configuration that the 3-phase dead time compensation values are converted into the dq-axes dead time compensation values by the 3-phase/dq-axes conversion, and the voltage command values on the dq-axes are compensated by feed-forwarding the dq-axes dead time compensation values. The dq-axes steering-assist command values are used in the compensation sign of the dead time. The compensation amount is changeable so that the magnitude of the compensation amount is optimal depending on the magnitude of the steering-assist command value $i_{qref}$ and the magnitude of the inverter-applying voltage VR.

Next, the spatial vector modulation will be described.

Figure 15:
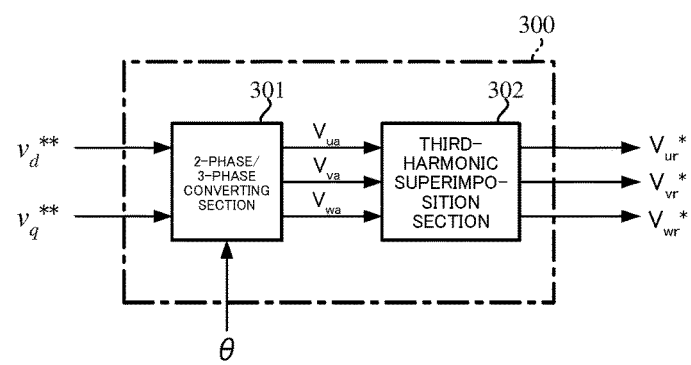
FIG. 15 is a block diagram showing a configuration example of a spatial vector modulating section.

As shown in FIG. 15, the spatial vector modulating section 300 may have a function that converts the 2-phase voltages $v_d^{}$ and $v_q^{}$ on the d-q space into the 3-phase voltages $V_{ua}$, $V_{va}$ and $V_{wa}$, and superimposes the third harmonic on the 3-phase voltages $V_{ua}$, $V_{va}$ and $V_{wa}$. For example, the method of the spatial vector modulation that the applicant proposes in Japanese Unexamined Patent Publication No. 2017-70066, WO2017/098840 (Japanese Patent Application No. 2015-239898) and the like may be used.

Figure 16:
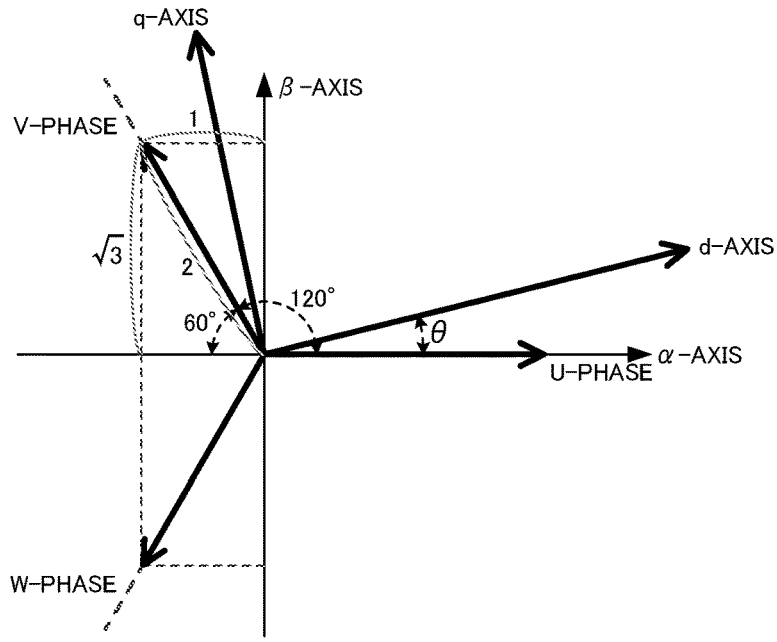
FIG. 16 is a diagram showing an operation example of the spatial vector modulating section.

That is, the spatial vector modulation has a function that performs a following coordinate transformation based on the voltage command values $v_d^{}$ and $v_q^{}$ on the d-q space, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the switching devices (the upper-arm Q1, Q3 and Q5, and the lower-arm Q2, Q4 and Q6) of the inverter with the bridge configuration. With reference to the coordinate transformation, in the spatial vector modulation, the voltage command values $v_d^{}$ and $v_q^{}$ perform the coordinate transformation to the voltage vectors Vα and Vβ in the α-β coordinate system based on an Expression 2. A relationship between the coordinate axes that are used in this coordinate transformation and the motor rotational angle θ is shown in FIG. 16.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix}$$ [Expression 2]

A relationship shown in an Expression 3 between a target voltage vector in the d-q coordinate system and a target voltage vector in the α-β coordinate system is existed. The absolute value of the target voltage vector is conserved.

$$|V| = \sqrt{(v_d^{})^2 + (v_q^{})^2} = \sqrt{V\alpha^2 + V\beta^2}$$ [Expression 3]

Figure 17:
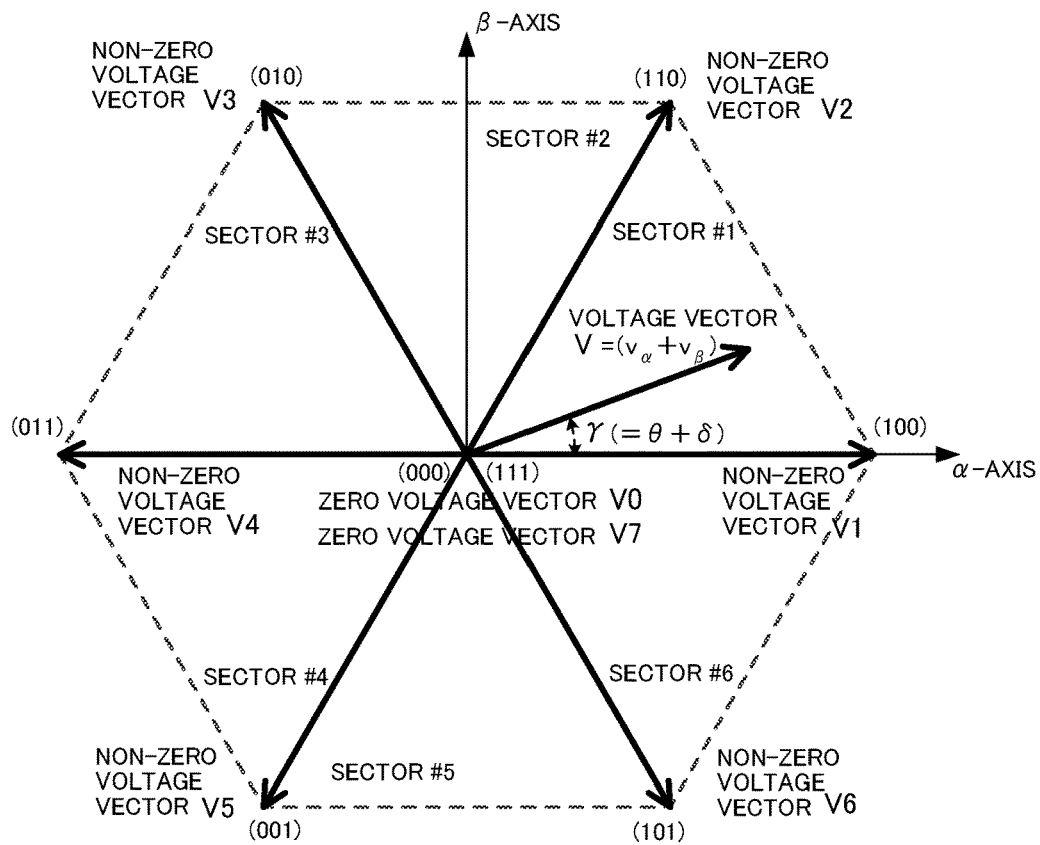
FIG. 17 is a diagram showing an operation example of the spatial vector modulating section.

In the switching pattern of the spatial vector control, the output voltage is defined by using eight discrete reference voltage vectors V0 to V7 (non-zero voltage vectors V1 to V6 that the phase differs every π/3 [rad] and zero voltage vectors V0 and V7) that are shown in the spatial vector diagram of FIG. 17, depending on the switching patterns S1 to S6 of the switching devices (the FETs) (Q1 to Q6). The selection of these reference output voltage vectors V0 to V7 and the occurring time are controlled. By using six regions sandwiched between adjacent reference output voltage vectors, the spatial vector can be divided into the six sectors #1 to #6, and the target voltage vector V is belong to any one of the sectors #1 to #6, and can be assigned to the sector number. The rotational angle γ in the α-β coordinate system of the target voltage vector V can determine which sector that is separated into a regular hexagon in the α-β space, as shown in FIG. 17, is existed in the target voltage vector V that is a synthetic vector of Vα and Vβ. The rotational angle γ is determined by a sum of the rotational angle θ of the motor and a phase δ obtained from the relationship of the voltage command values $v_d^{}$ and $v_q^{}$ in the d-q coordinate system (γ=θ+δ).

Figure 18:
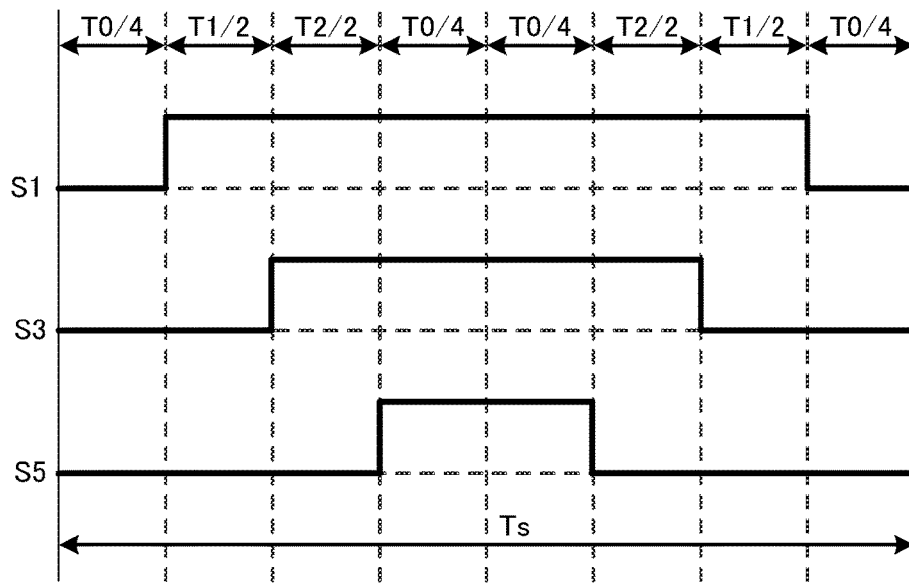
FIG. 18 is a timing chart showing an operation example of the spatial vector modulating section.

FIG. 18 shows a basic timing chart that the switching pulse width and the timing in the turning-ON/turning-OFF signals S1 to S6 to the switching devices (the FETs) are determined in order to output the target voltage vector from the inverter by a digital control by means of the switching patterns S1, S3 and S5 of the inverter in the spatial vector control. The spatial vector modulation performs the calculation and the like in every defined sampling period Ts, and outputs the respective pulse widths and the timings in the switching patterns S1 to S6 to which the calculation result is transformed in the next sampling period Ts.

The spatial vector modulation generates the switching patterns S1 to S6 depending on the sector number that is obtained based on the target voltage vector V. In FIG. 18, in a case of the sector number #1 (n=1), one example of the switching patterns S1 to S6 of the inverter is shown. The signals S1, S3 and S5 show the gate signals of the switching devices Q1, Q3 and Q5 that are corresponding to the upper arm. The horizontal axis denotes a time, and Ts is corresponding to the switching period and is divided into eight periods, T0/4, T1/2, T2/2, T0/4, T0/4, T2/2, T1/2 and T0/4. The periods T1 and T2 are the time depending on the sector number n and the rotational angle γ.

Figure 19:
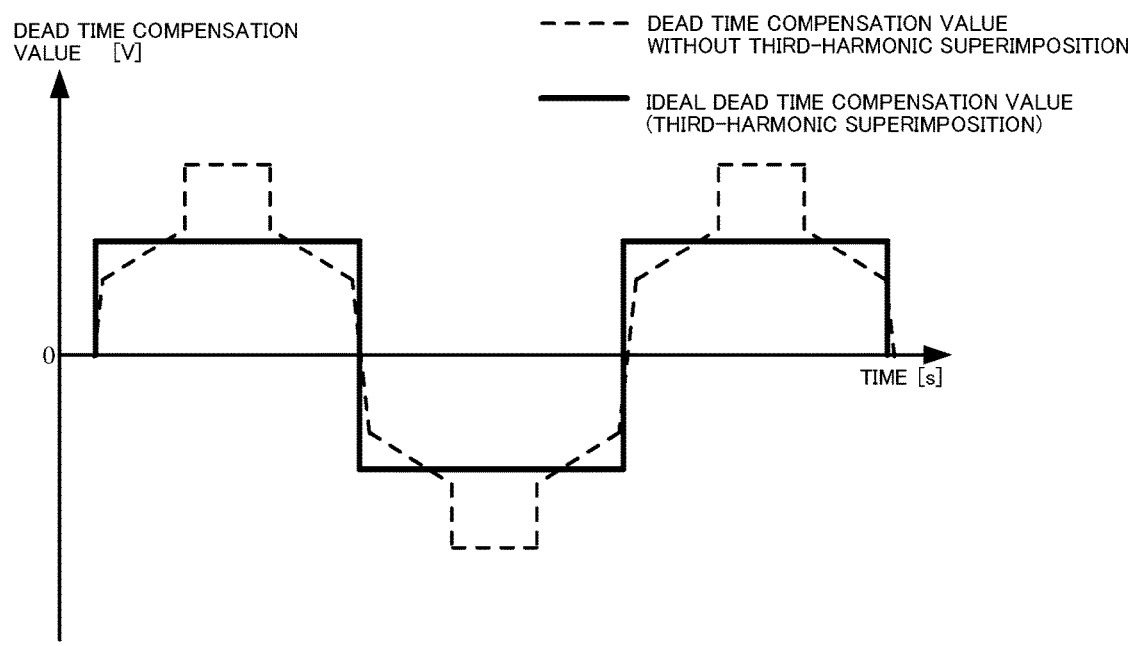
FIG. 19 is a waveform chart showing an effect of the spatial vector modulation.

In a case that the spatial vector modulation is not performed, the dead time compensation of the present invention is applied on the dq-axes, and the dead time compensation value waveform (the U-phase waveform) that the dq-axes/3-phase converting is performed to only the dead time compensation value is shown in a waveform represented by a dashed line of FIG. 19 that the third-order component is removed. The same phenomena are exhibited in the V-phase and the W-phase. By applying the spatial vector modulation instead of the dq-axes/3-phase converting, the third-harmonic can be superimposed on the 3-phase signals, the third-order component that is removed by the 3-phase converting can be compensated, and the ideal dead time compensation waveform that is shown in a solid line of FIG. 19 can be generated.

Figure 20:
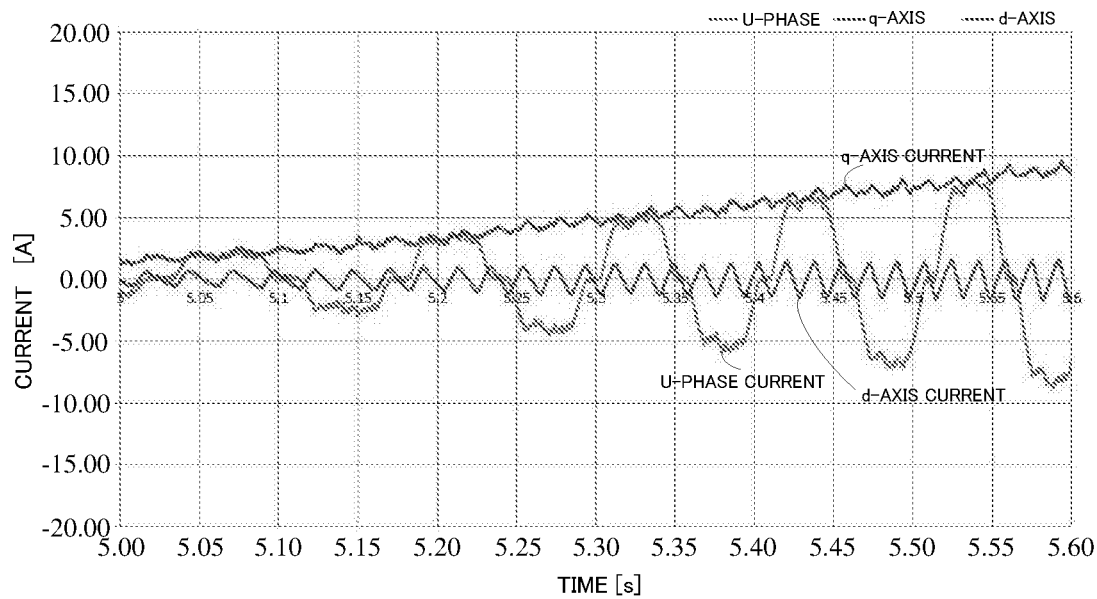
FIG. 20 is a waveform chart showing an effect of the present invention (the first embodiment)
Figure 21:
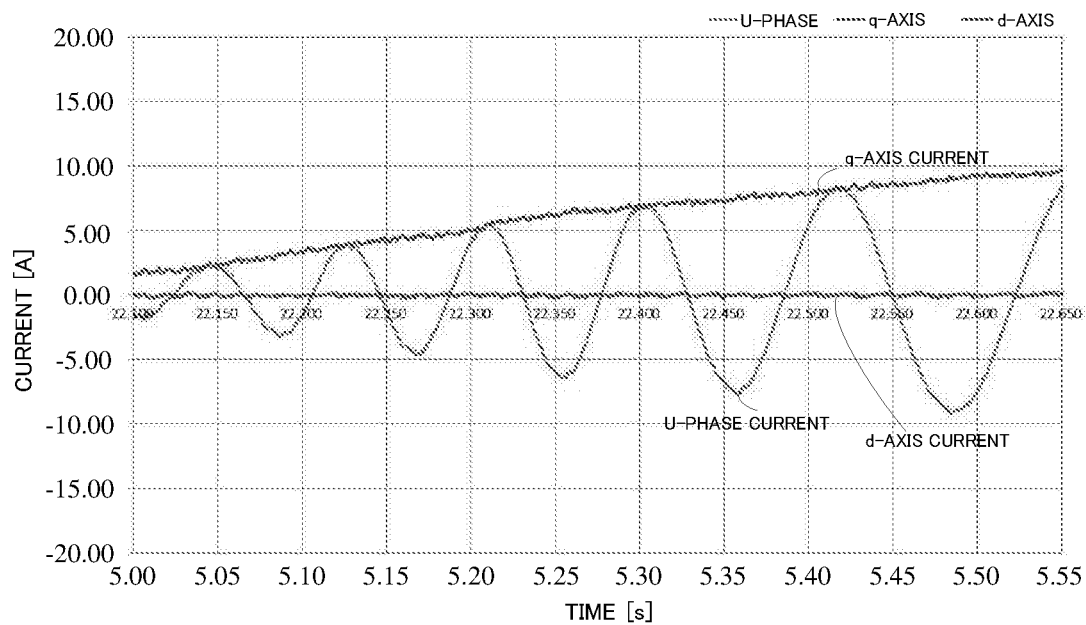
FIG. 21 is a waveform chart showing an effect of the present invention (the first embodiment)

FIGS. 20 and 21 are simulation results showing an effect of the present invention (the first embodiment). FIG. 20 shows the U-phase current, the d-axis current and the q-axis current in a case that the dead time compensation is not performed. By applying the dead time compensation of the present invention (the first embodiment), in the low speed and middle speed steering states, the improvements in the waveform distortion of the phase currents and the dq-axes currents as shown in FIG. 21 (the ripple is reduced in the dq-axes current waveforms and the phase currents whose waveforms are almost sinusoidal are obtained) can be confirmed. The torque ripple in steering and the steering sound are improved.

FIGS. 20 and 21 typically show the U-phase current.

Next, a second embodiment according to the present invention will be described.

Figure 22:
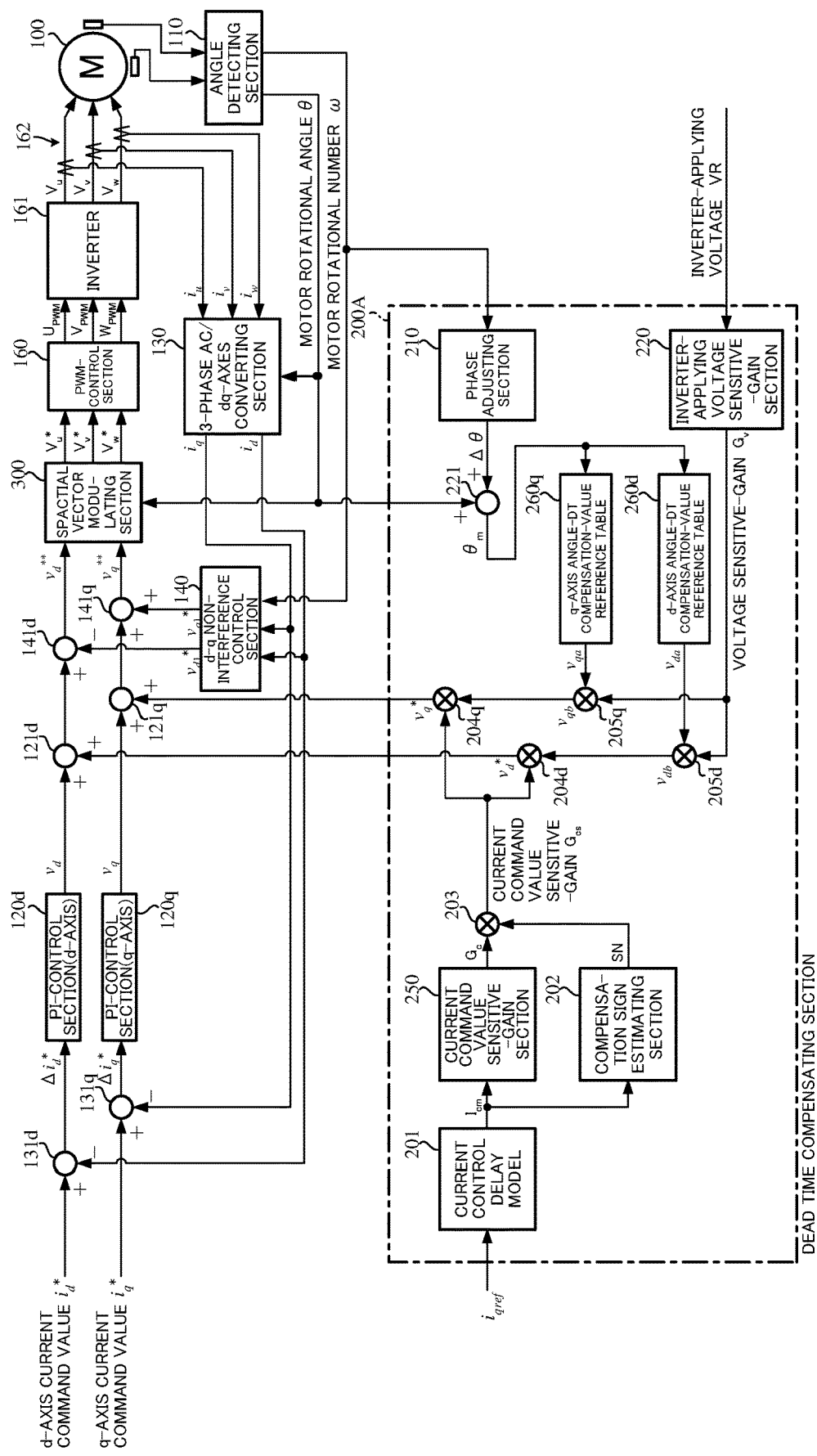
FIG. 22 is a block diagram showing a configuration example (the second embodiment) of the present invention.
Figure 23:
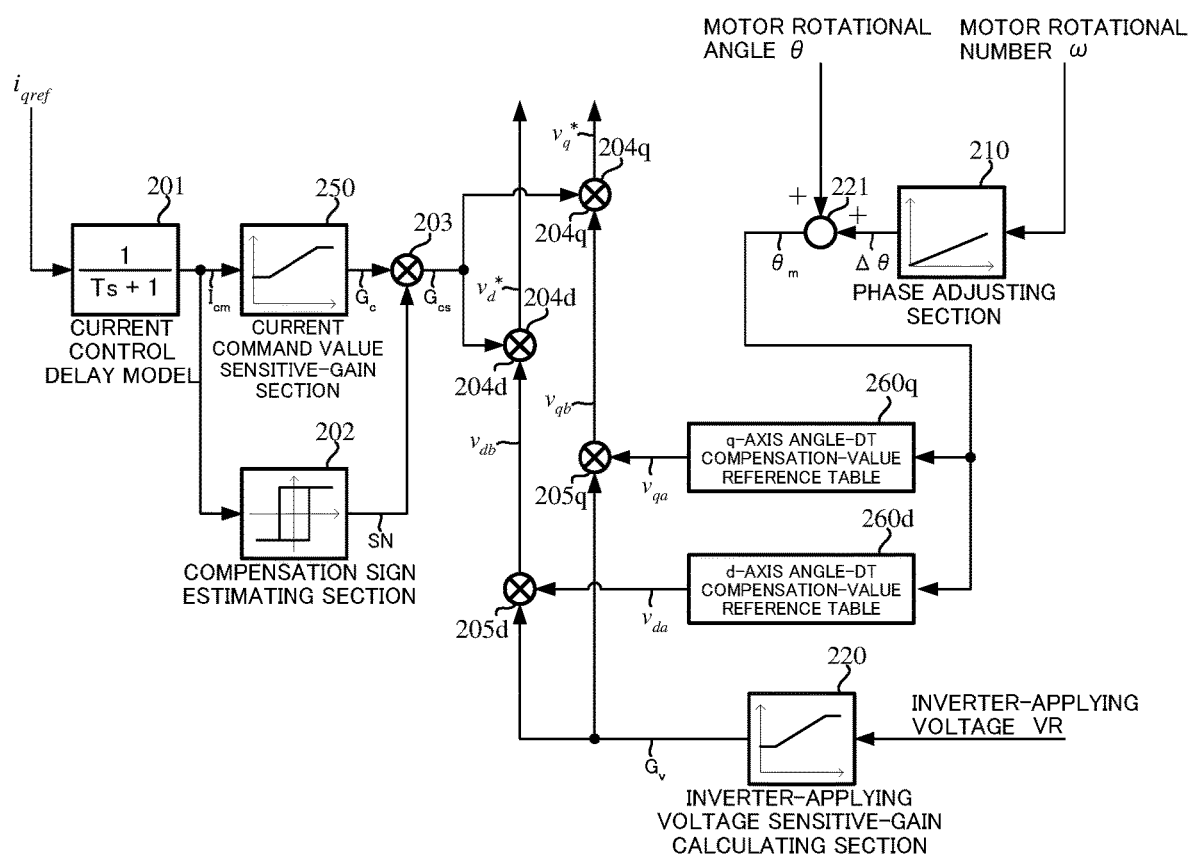
FIG. 23 is a block diagram showing a detail configuration example of the dead time compensating section according to the present invention.

FIG. 22 shows an overall configuration of the present invention (the second embodiment), corresponding to FIG. 5. The dead time compensation section 200A that calculates the dead time compensation value $V_d^*$ and $V_q^*$ on the dq-axes is disposed, and the detail configuration of the dead time compensation section 200A is shown in FIG. 23. In the following, the explanation is performed with reference to FIG. 23.

The dead time compensation section 200A comprises the current control delay model 201, which has the same configuration as that of the first embodiment and performs the same operation as that of the first embodiment, the compensation sign estimating section 202, the phase adjusting section 210, the inverter applying voltage sensitive gain calculating section 220, the adding section 221 and the multiplying sections 203, 204d and 204q. In the second embodiment, ad-axis angle-dead time compensation-value reference table 260d that inputs the motor rotational angle $\theta_m$ and outputs a d-axis dead time reference compensation value $v_{da}$, and a q-axis angle-dead time compensation-value reference table 260q that inputs the motor rotational angle $\theta_m$ and outputs a q-axis dead time reference compensation value $v_{qa}$ are provided. The dead time reference compensation values $v_{da}$ and $v_{qa}$ are respectively inputted into the multiplying sections 205d and 205q, and are multiplied with the voltage sensitive-gain $G_v$ from the inverter-applying voltage sensitive-gain section 220. The dead time compensation values $v_{db}$ and $v_{qb}$, which the dead time reference compensation values $v_{da}$ and $v_{qa}$ are multiplied with the voltage sensitive-gain $G_v$, are respectively inputted into the multiplying sections 204d and 204q. The current command value sensitive-gain $G_{cs}$ is inputted into the multiplying sections 204d and 204q. The dead time compensation values $v_d^*$ and $v_q^*$, which are the results that the dead time compensation values $v_{db}$ and $v_{qb}$ are multiplied with the current command value sensitive-gain $G_{cs}$, are outputted from the multiplying sections 204d and 204q.

Figure 24:
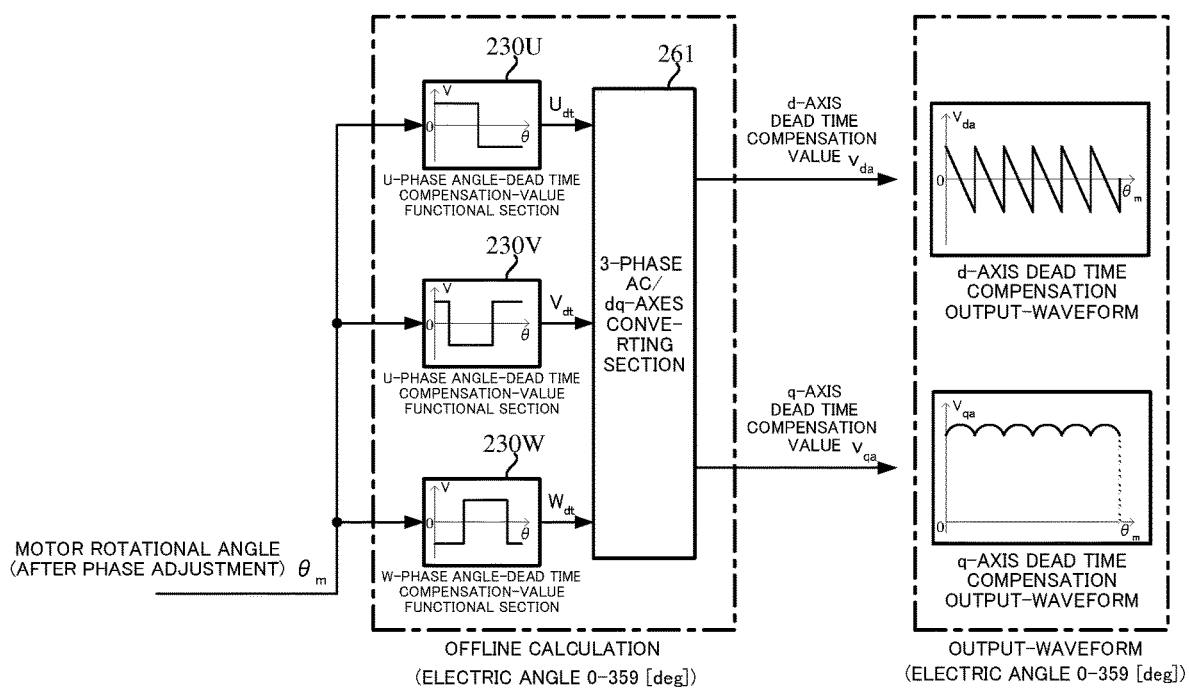
FIG. 24 is a diagram showing an operation example of the respective angle-dead time compensation-value functional section.

The dq-axes angle-dead time compensation-value reference tables 260d and 260q, as shown in FIG. 24 in detail, calculate 3-phase dead time compensation values, which are the angle functions and are needed in the three phases, in an offline, and convert the 3-phase dead time compensation values into dead time compensation values on the dq-axes. That is, as described in the first embodiment, the 3-phase angle-dead time compensation value functional sections 230U, 230V and 230W output respective phase rectangular wave dead time reference compensation values $U_{dt}$, $V_{dt}$ and $W_{dt}$ whose phases are shifted each other by 120 [deg] in a range of "0" to "359" [deg] in the electric angle, to the phase-adjusted motor rotational angle $\theta_m$. The dead time compensation-value functional sections 230U, 230V and 230W calculate the dead time compensation values, which are needed in the three phases, as the function depending on the angle in the offline, and output the dead time reference compensation values $U_{dt}$, $V_{dt}$ and $W_{dt}$. The angle functions of the dead time reference compensation values $U_{dt}$, $V_{dt}$ and $W_{dt}$ are different depending on the characteristic of the dead time in the ECU.

Figure 25A:
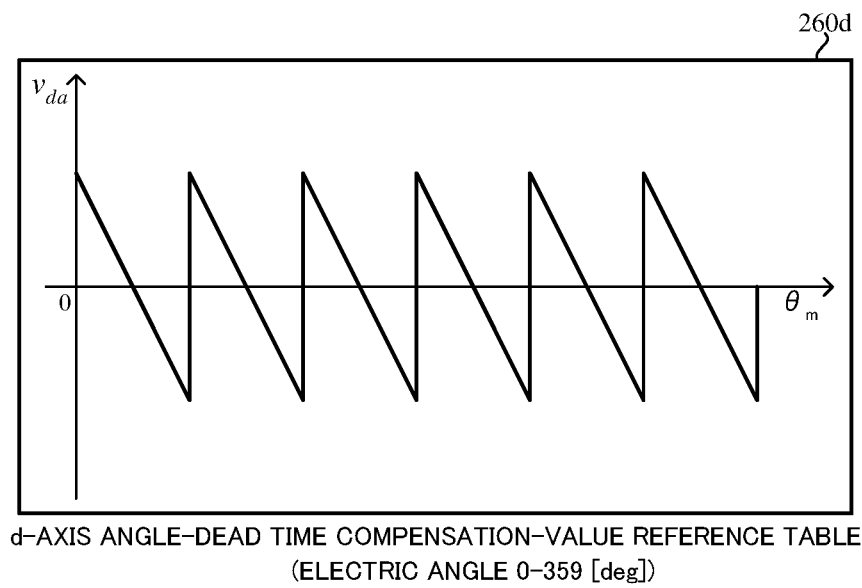
FIG. 25A and FIG. 25B are characteristic diagrams showing an output voltage characteristic of a dq-axes angle-dead time compensation-value reference table.
Figure 25B:
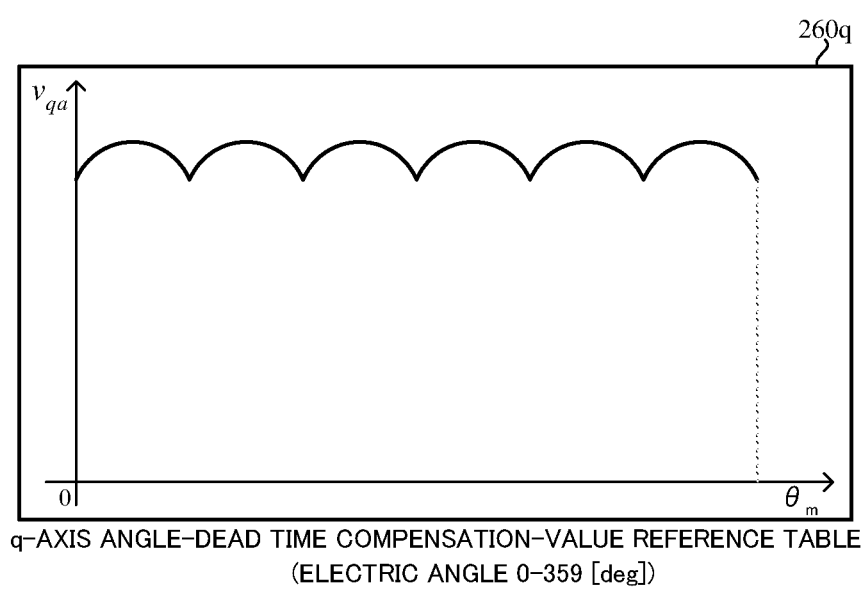

The dead time reference compensation values $U_{dt}$, $V_{dt}$ and $W_{dt}$ are inputted into the 3-phase AC/dq-axes converting section 261, and are converted into the dq-axes dead time compensation values $v_{da}$ and $v_{qa}$ whose output waveforms are shown in FIG. 24. The angle-dead time compensation-value reference tables 260d and 260q whose input is the angle $\theta_m$ are generated based on the dq-axes output waveforms of FIG. 24. As shown in FIG. 25A, the dead time compensation-value reference table 260d has a saw teeth shape output voltage characteristic (a d-axis dead time reference compensation value) for the motor rotational angle $\theta_m$. As shown in FIG. 25B, the dead time compensation-value reference table 260q is added with the offset voltage, and has a wave shape output voltage characteristic (a q-axis dead time reference compensation value).

The dead time reference compensation values $v_{da}$ and $v_{qa}$ from the angle-dead time compensation-value reference tables 260d and 260q are respectively inputted into the multiplying sections 205d and 205q, and are multiplied with the voltage sensitive-gain $G_v$. The dq-axes dead time compensation values $v_{db}$ and $v_{qb}$, which are multiplied with the voltage sensitive-gain $G_v$, are respectively inputted into the multiplying sections 204d and 204q, and are multiplied with the current command value sensitive-gain $G_{cs}$. The dead time compensation values $v_d^*$ and $v_q^*$ from the multiplying sections 204d and 204q are respectively added to the voltage command values $v_d$ and $v_q$ at the adding sections 121d and 121q. The added values are inputted into the spatial vector modulation section 300 as the voltage command values $v_d^{}$ and $v_q^{}$.

In the present invention (the second embodiment), the dead time compensation values are calculated from the angle-dead time compensation-value reference table which uses the function depending on the motor rotational angle (the electric angle). The second embodiment has a configuration that the dead time compensation values are compensated by directly feed-forwarding (adding) to the voltage command values on the dq-axes. The steering-assist command value ($i_{qref}$) is used in the compensation sign of the dead time. The compensation amount is changeable so that the magnitude of the compensation amount is optimal depending on the magnitude of the steering-assist command value $i_{qref}$ and the magnitude of the inverter-applying voltage.

Figure 26:
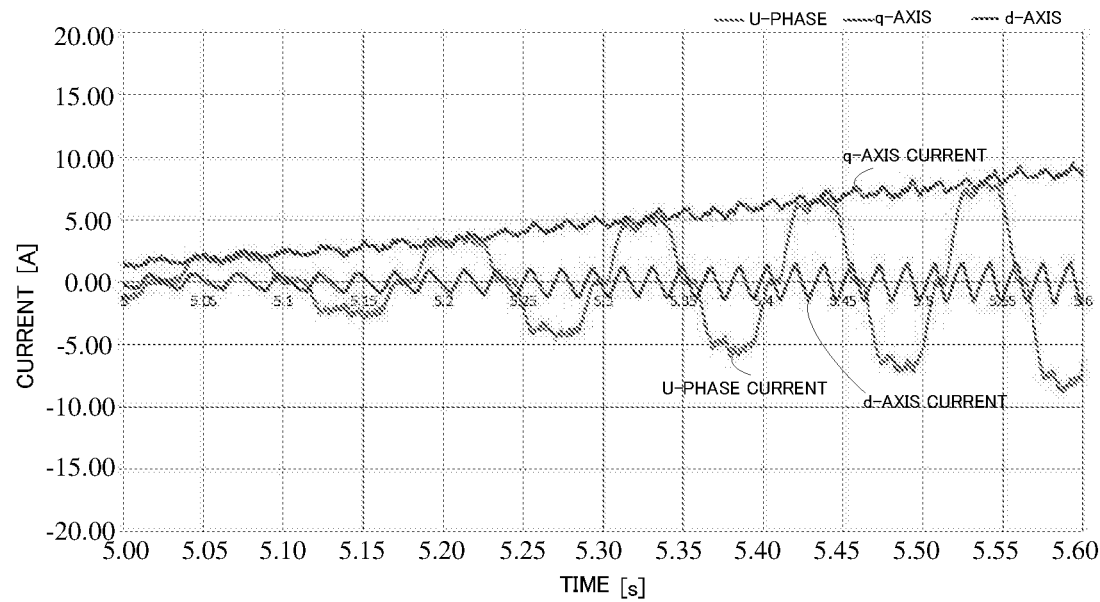
FIG. 26 is a waveform chart showing an effect of the present invention (the second embodiment)
Figure 27:
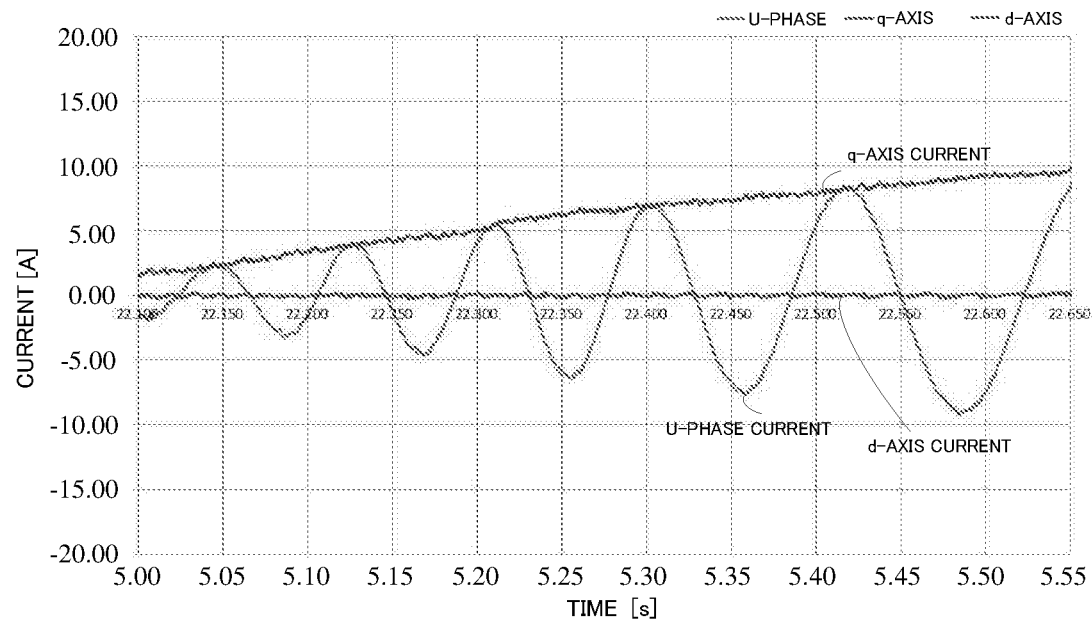
FIG. 27 is a waveform chart showing an effect of the present invention (the second embodiment)

FIGS. 26 and 27 show the effect of the second embodiment, and also show the U-phase results by a bench test apparatus to which the actual vehicle is simulated. FIG. 26 shows the U-phase current, the d-axis current and the q-axis current in a case that the dead time compensation is not performed. By applying the dead time compensation of the present invention (the second embodiment), in the low speed and middle speed steering states, the improvements in the waveform distortion of the phase currents and the dq-axes currents as shown in FIG. 27 (the ripple is reduced in the dq-axes current waveforms and the phase currents whose waveforms are almost sinusoidal are obtained) can be confirmed. The torque ripple in the steering and the steering sound are improved.

Figure 28:
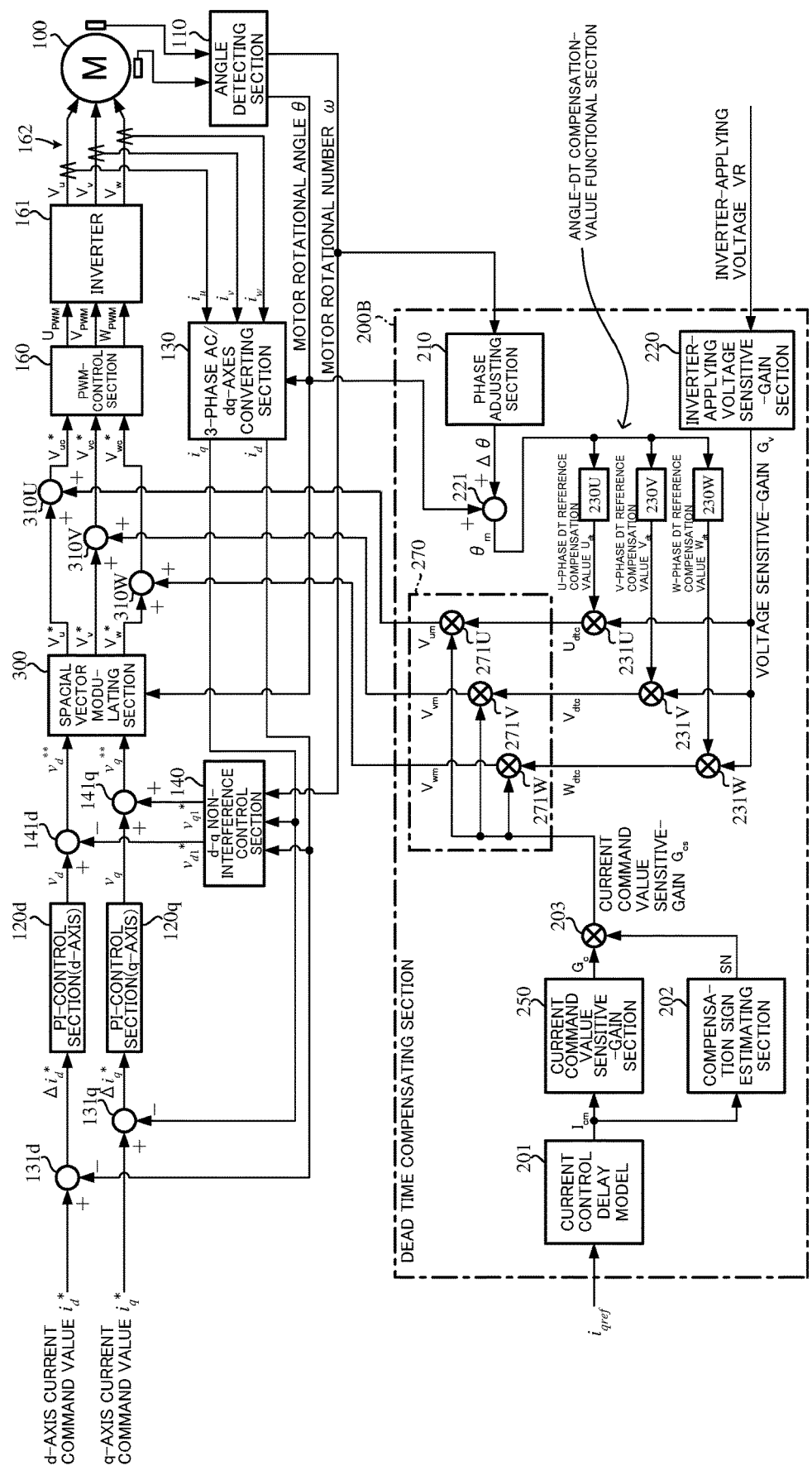
FIG. 28 is a block diagram showing a configuration example (the third embodiment) of the present invention.
Figure 29:
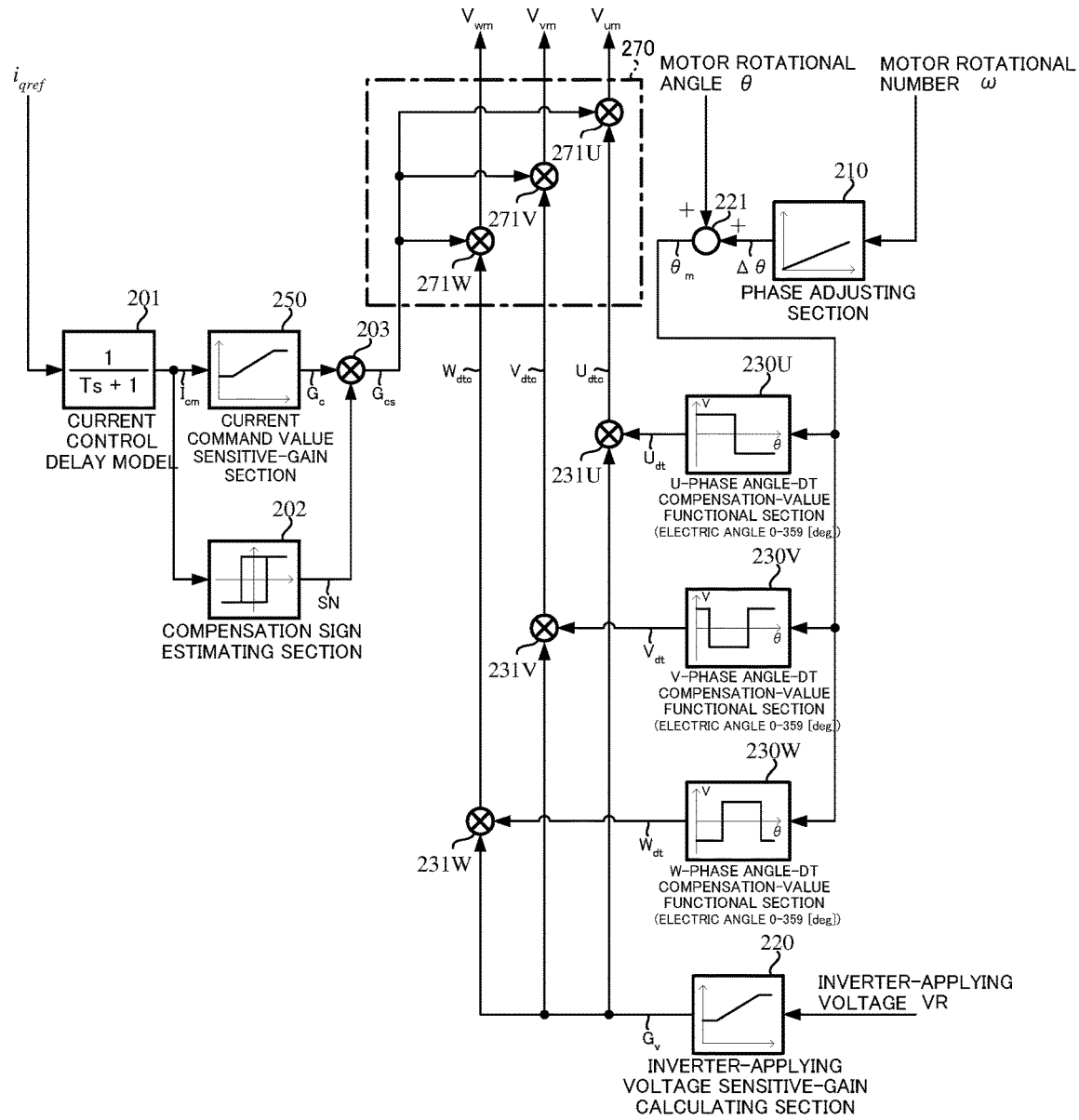
FIG. 29 is a block diagram showing a detail configuration example of the dead time compensating section according to the present invention.

Next, a third embodiment of the present invention is shown in FIG. 28, corresponding to FIG. 5. A detail of the dead time compensation section 200B is shown in FIG. 29. In the third embodiment, the dead time compensating section 200B calculates the 3-phase dead time compensation values $V_{um}$, $V_{vm}$ and $V_{wm}$, and the dead time compensation is performed by adding the 3-phase dead time compensation values $V_{um}$, $V_{vm}$ and $V_{wm}$ to the 3-phase voltage command values $V_u^*$, $V_v^*$ and $V_w^*$ from the spatial vector modulation section 300.

In the third embodiment, the compensation value adjusting section 270 comprising the multiplying sections 271U, 271V and 271W is provided. The dead time compensation values $U_{dtc}$, $V_{dtc}$ and $W_{dtc}$ from the multiplying sections 231U, 231V and 231W are respectively inputted into the multiplying sections 271U, 271V and 271W, and are multiplied with the current command value sensitive-gain $G_{cs}$. The multiplied results using the current command value sensitive-gain $G_{cs}$ are outputted as the dead time compensation values $V_{um}$, $V_{vm}$ and $V_{wm}$, and the dead time compensation values $V_{um}$, $V_{vm}$ and $V_{wm}$ are respectively added to the voltage command values $V_u^*$, $V_v^*$ and $V_w^*$ after the spatial vector modulation at the adding sections 310U, 310V and 310W. The voltage command values $V_{uc}^*$, $V_{vc}^*$ and $V_{wc}^*$ that are the added results are inputted into the PWM-control section 160.

In the present invention (the third embodiment), the dead time compensation values are 3-phase functions depending on the motor rotational angle (the electric angle), and the control unit (ECU) has a configuration that the dead time compensation values are compensated by directly feed-forwarding to the 3-phase voltage command values. The dq-axes steering-assist command values are used in the compensation sign of the dead time. The compensation amount is changeable so that the magnitude of the compensation amount is optimal depending on the magnitude of the steering-assist command value and the magnitude of the inverter applying voltage.

Figure 30:
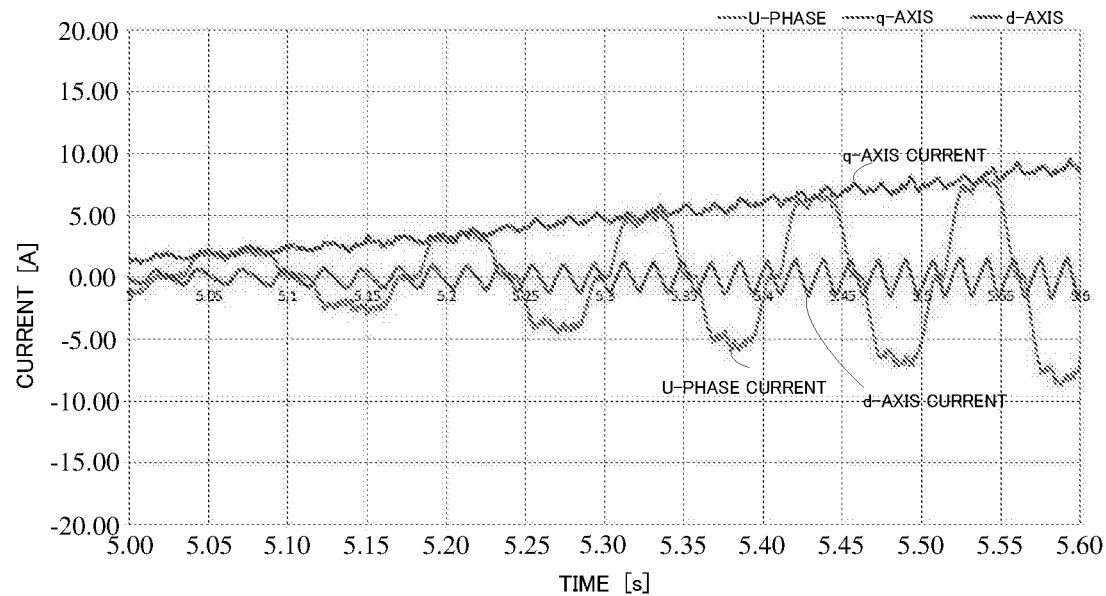
FIG. 30 is a waveform chart showing an effect of the present invention (the third embodiment)
Figure 31:
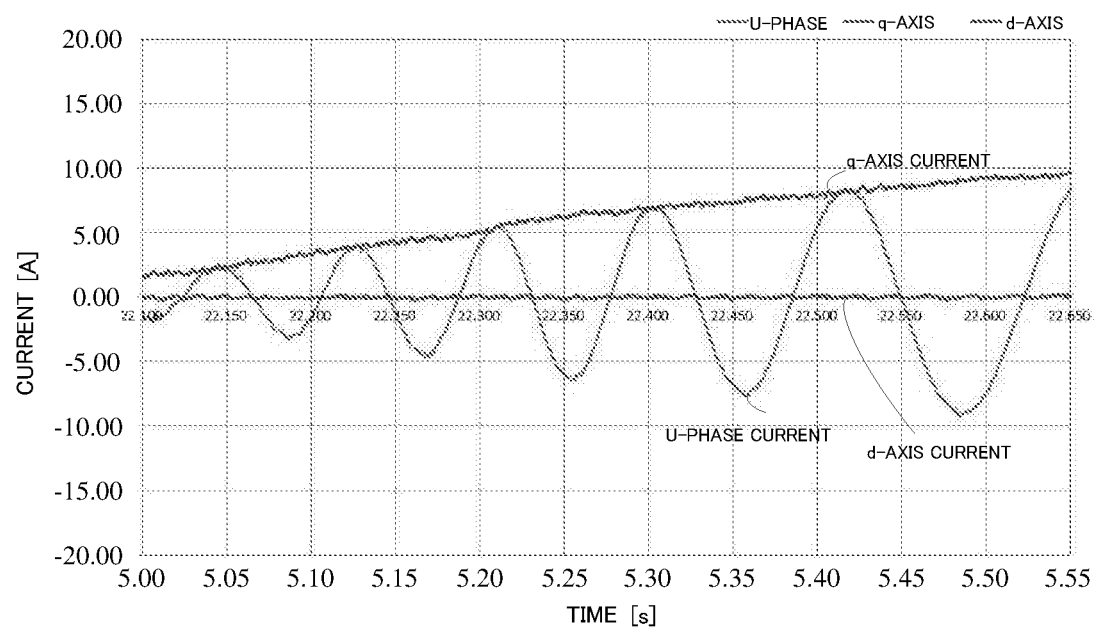
FIG. 31 is a waveform chart showing an effect of the present invention (the third embodiment).

FIGS. 30 and 31 are simulation results showing an effect of the present invention (the third embodiment). FIG. 30 shows the U-phase current, the d-axis current and the q-axis current in a case that the dead time compensation is not performed. By applying the dead time compensation of the present invention (the third embodiment), in the low speed and middle speed steering states, the improvements in the waveform distortion of the phase currents and the dq-axes currents as shown in FIG. 31 (the ripple is reduced in the dq-axes current waveforms and the phase currents whose waveforms are almost sinusoidal are obtained) can be confirmed. The torque ripple in steering and the steering sound are improved.

EXPLANATION OF REFERENCE NUMERALS 1 handle (steering wheel)
2 column shaft (steering shaft, handle shaft)
10 torque sensor
12 vehicle speed sensor
13 battery
20, 100 motor
30 control unit (ECU)
31 steering-assist command value calculating section
35, 203, 204 PI-control section
36, 160 PWM-control section
37, 161 inverter
110 angle detecting section
130 3-phase/dq-axes converting section
140 d-q non-interference control section
200, 200A, 200B dead time compensating section
201 current control delay model
202 compensation sign estimating section
210 phase adjusting section
220 inverter-applying voltage sensitive-gain section
230U, 230V, 230W angle-dead time compensation-value functional section
240 3-phase AC/dq-axes converting section
250 current command value sensitive-gain section
300 spatial vector modulating section
301 2-phase/3-phase converting section
302 third-harmonic superimposition section

The invention claimed is:

1. An electric power steering apparatus of a vector control system, the electric power steering apparatus comprising:
at least one hardware processor configured to implement:
calculating dq-axes steering-assist command values based on at least a steering torque,
calculating dq-axes voltage command values from said dq-axes steering-assist command values;
converting said dq-axes voltage command values into three-phase duty command values;
driving-controlling a 3-phase brushless motor by an inverter of a pulse width modulation (PWM) control; and
controlling application of an assist torque to a steering system of a vehicle,
wherein a dead time compensation of said inverter is performed by adding dq-axes dead time compensation values obtained by multiplying dq-axes dead time reference compensation values, which are obtained from an angle-dead time compensation-value reference table having a characteristic that 3-phase dead time compensation values based on a motor rotational angle are converted into 2-phase values, by a voltage sensitive-gain sensitive to an inverter-applying voltage, to said dq-axes voltage command values.

2. The electric power steering apparatus according to claim 1, wherein a phase of said motor rotational angle is changeable depending on motor rotational number.

3. The electric power steering apparatus according to claim 2, wherein said dq-axes dead time compensation values are changeable based on at least one of said dq-axes steering-assist command values.

4. The electric power steering apparatus according to claim 1, wherein the at least one hardware processor is further configured to implement calculating a current command value sensitive-gain that makes a compensation amount of said dq-axes dead time compensation values be changeable depending on at least one of said dq-axes steering-assist command values.

5. An electric power steering apparatus of a vector control system, the electric power steering apparatus comprising:
at least one hardware processor configured to implement:
calculating dq-axes steering-assist command values based on at least a steering torque;
calculating dq-axes current command values from said dq-axes steering-assist command values;
converting said dq-axes current command values into 3-phase duty command values;
driving-controlling a 3-phase brushless motor by an inverter of a pulse width modulation (PWM) control;
controlling application of an assist torque to a steering system of a vehicle;
an angle-dead time compensation-value functional section to calculate 3-phase dead time reference compensation values based on a motor rotational angle;
an inverter-applying voltage sensitive-gain calculating section to calculate a voltage sensitive-gain based on an inverter-applying voltage; and
a dead time compensation-value outputting section to add dq-axes dead time compensation values that are obtained by multiplying said 3-phase dead time reference compensation values with said voltage sensitive-gain and converting 3-phase multiplied values into dq-axes values, to dq-axes voltage command values that are obtained by processing said dq-axes current command values.

6. The electric power steering apparatus according to claim 5,
wherein said dead time compensation-value outputting section comprises:
multiplying sections to multiply said 3-phase dead time reference compensation values with said voltage sensitive-gain; and
a 3-phase alternating current (AC) to dq-axes converting section to convert 3-phase outputs of said multiplying sections into said dq-axes dead time compensation values.

7. The electric power steering apparatus according to claim 5, wherein the at least one hardware processor is further configured to implement a current command value sensitive-gain calculating section to calculate a current command value sensitive-gain that makes a compensation amount of said dq-axes dead time compensation values be changeable depending on at least one of said dq-axes steering-assist command values.

8. An electric power steering apparatus of a vector control system, the electric power steering apparatus comprising:
at least one hardware processor configured to implement:
calculating dq-axes steering-assist command values based on at least a steering torque;
calculating dq-axes voltage command values from said dq-axes steering-assist command values;
converting said dq-axes voltage command values into 3-phase duty command values;
driving-controlling a 3-phase brushless motor by an inverter of a pulse width modulation (PWM) control;
controlling application of an assist torque to a steering system of a vehicle;
an angle-dead time compensation-value reference table having a characteristic that 3-phase dead time compensation values based on a motor rotational angle are converted into 2-phase values;
an inverter-applying voltage sensitive-gain calculating section to calculate a voltage sensitive-gain based on an inverter-applying voltage;
a first multiplying section to multiply dq-axes dead time reference compensation values from said angle-dead time compensation-value reference table with said voltage sensitive-gain;
a current command value sensitive-gain calculating section to calculate a current command value sensitive-gain in order that a compensation amount is changeable depending on said dq-axes steering-assist command values; and
a second multiplying section to multiply outputs of said first multiplying section with said current command value sensitive-gain,
wherein a dead time compensation is performed by adding outputs of said second multiplying section to said dq-axes voltage command values.

9. The electric power steering apparatus according to claim 8,
wherein said current command value sensitive-gain calculating section comprises:
a current control delay model to compensate a delay of a current by inputting at least one of said dq-axes steering-assist command values;
a compensation sign estimating section to estimate a sign of an output of said current control delay model;
a current command value sensitive-gain section to output a sensitive gain based on an output of said current control delay model; and
a third multiplying section to multiply said sensitive gain with said sign.

10. An electric power steering apparatus of a vector control system, the electric power steering apparatus comprising:
at least one hardware processor configured to implement:
calculating dq-axes steering-assist command values based on at least a steering torque;
calculating dq-axes current command values from said dq-axes steering-assist command value;
converting said dq-axes current command values into 3-phase duty command values;
driving-controlling a 3-phase brushless motor by an inverter of a pulse width modulation (PWM) control;
applying an assist torque to a steering system of a vehicle;
a spatial vector modulating section to obtain 3-phase voltage command values by spatial-vector-modulating said dq-axes current command values;
an angle-dead time compensation-value functional section to calculate 3-phase dead time reference compensation values based on a motor rotational angle;

an inverter-applying voltage sensitive-gain calculating section to calculate a voltage sensitive-gain based on an inverter-applying voltage;

a first multiplying section to obtain first 3-phase dead time compensation values by multiplying said 3-phase dead time reference compensation values with said voltage sensitive-gain;

a current command value sensitive-gain calculating section to calculate a current command value sensitive-gain in which a compensation amount of said first 3-phase dead time compensation values is changeable depending on said dq-axes steering-assist command values; and a dead time compensation-value outputting section to output second dead time compensation values by multiplying said first 3-phase dead time compensation values with said current command value sensitive-gain, wherein a dead time compensation of said inverter is performed by adding said second dead time compensation values to said 3-phase voltage command values.

11. The electric power steering apparatus according to claim 10, wherein said current command value sensitive-gain calculating section comprises:

a current control delay model to compensate a delay of a current by inputting at least one of said dq-axes steering-assist command values;

a compensation sign estimating section to estimate a sign of an output of said current control delay model;

a current command value sensitive-gain section to output said current command value sensitive-gain based on an output of said current control delay model; and a second multiplying section to multiply said current command value sensitive-gain with said sign.

12. The electric power steering apparatus according to claim 1, wherein controlling application of the assist torque comprises controlling the steering system to implement physically outputting the assist torque.

* * * * *